United States Patent
Price et al.

(10) Patent No.: US 10,559,135 B1
(45) Date of Patent: Feb. 11, 2020

(54) FIXED HOLOGRAMS IN MOBILE ENVIRONMENTS

(71) Applicant: MICROSOFT TECHNOLOGY LICENSING, LLC, Redmond, WA (US)

(72) Inventors: Raymond Kirk Price, Redmond, WA (US); Yuri Pekelny, Seattle, WA (US); Michael Bleyer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/355,244

(22) Filed: Mar. 15, 2019

(51) Int. Cl.
| | |
|---|---|
| *G06T 19/00* | (2011.01) |
| *G06T 19/20* | (2011.01) |
| *G03H 1/00* | (2006.01) |
| *G02B 27/01* | (2006.01) |
| *G03H 1/02* | (2006.01) |

(52) U.S. Cl.
CPC ........ *G06T 19/006* (2013.01); *G02B 27/0172* (2013.01); *G03H 1/0005* (2013.01); *G03H 1/02* (2013.01); *G06T 19/20* (2013.01); *G02B 2027/0181* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 2003/0210228 | A1* | 11/2003 | Ebersole | G02B 27/017 345/157 |
| 2015/0206351 | A1* | 7/2015 | Abercrombie | G06T 19/006 345/419 |
| 2015/0294505 | A1* | 10/2015 | Atsmon | G06T 19/006 345/633 |
| 2015/0317834 | A1* | 11/2015 | Poulos | G06F 3/012 345/619 |
| 2015/0323933 | A1* | 11/2015 | Darbois | G05D 1/0202 701/4 |
| 2016/0019808 | A1* | 1/2016 | Chavez | G09B 9/302 434/38 |
| 2017/0186203 | A1* | 6/2017 | Fournier | G08G 5/0013 |
| 2018/0261148 | A1* | 9/2018 | Manjon Sanchez | G02B 27/01 |

* cited by examiner

*Primary Examiner* — Frank S Chen
(74) *Attorney, Agent, or Firm* — Workman Nydegger

(57) ABSTRACT

Techniques are provided for controlling the selective filtering of display positioning information used to position holograms in mixed-reality (MR) scenes. A first and second environment are identified, the first is moving relative to the second. First and second display positioning information (i.e. "environmental data"), are obtained for the two environments. A determination is made that a hologram is to be placed at a fixed position relative to either one of the first or second environments. When the hologram is placed relative to the first environment, at least some of the second display positioning information is filtered from the environmental data. Alternatively, when the hologram is placed relative to the second environment, at least some of the first display positioning information is filtered.

20 Claims, 16 Drawing Sheets

FIXED HOLOGRAMS IN MOBILE ENVIRONMENTS

BACKGROUND

Mixed-reality (MR) systems/devices include virtual-reality (VR) and augmented-reality (AR) systems. Conventional VR systems create completely immersive experiences by restricting users' views to only virtual images rendered in VR scenes/environments. Conventional AR systems create AR experiences by visually presenting virtual images that are placed in or that interact with the real world. As used herein, VR and AR systems are described and referenced interchangeably via use of the phrase "MR system." As also used herein, the terms "virtual image" or "hologram" refer to any type of digital image rendered by an MR system. Furthermore, it should be noted that a head-mounted device (HMD) typically provides the display used by the user to view and/or interact with holograms provided within an MR scene.

A MR system's HMD typically includes a head tracking system having one or more head tracking camera(s) and inertial measurement units (IMUs). Using these cameras, the head tracking system beneficially determines the HMD's position and pose relative to its surrounding environment. It should be noted that the HMD's position and pose are both relied upon by many existing MR systems when visually placing/rendering holograms into mixed-reality (MR) scenes. By continuously or frequently determining position and pose, MR systems can provide display corrections to its rendered holograms. These display corrections enable the MR systems to render realistic holograms because they enable the MR systems to dynamically respond to HMD's movements in real-time and to update the holograms in response to those movements.

Some MR systems additionally use an inertial measurement unit (IMU) to monitor the HMD's acceleration changes in order to determine the HMD's position and pose. While IMU data is helpful in determining position and pose, IMU data should not be used in isolation for head tracking, pose/position estimation, or hologram rendering/placement. The reason is because an IMU calculates position using a square function of time, and any errors in that calculation are proportional to the IMU's sampling time. Consequently, in some cases, the determined position/pose (as determined by the IMU) may be significantly skewed as a result of the errors being multiplied by the time squared.

Despite the potential for skewed information, IMU data can still be highly valuable when determining position and pose. As such, some MR systems use a combination of information from their head tracking cameras and their IMUs, with the data from each combined using a Kalman filter, in order to accurately track and validate position and pose of the HMD over time. That is, IMU data can be used to augment or supplement the head tracking camera data, thereby resulting in a more reliable determination of the HMD's position and pose. A more reliable determination of position and pose allows for improved hologram placement.

Unfortunately, if the HMD is positioned within a moving environment (e.g., an airplane, automobile, ship, elevator, etc.), significant discrepancies can arise between display positioning information provided by the head tracking system and display positioning information provided by the IMU. These discrepancies result in conflicts to the HMD's determined position and pose. Such conflicts can, in turn, cause the MR system to misplace holograms within the MR scenes based on bad data. This misplacement is particularly pronounced for holograms that are supposed to be rendered at fixed locations. As such, there is a significant need to improve how holograms are placed within an MR scene, especially when rendering MR scenes for an HMD located in a moving environment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices used for controlling and, in some instances, stabilizing the visual placement of holograms within MR scenes. This stabilization may occur even when certain position data, which is used for the visual placement of the holograms, is conflicted as a result of being collected while the rendering MR device is located within one or more moving environments.

In some embodiments, a first environment (e.g., perhaps the cockpit of a plane or perhaps the inside of an elevator) is identified, where this first environment is moving relative to a second environment (e.g., perhaps the runway for the plane or perhaps a building that includes the elevator). In such instances, display positioning information is obtained for the first environment, and second display positioning information is obtained for the second environment, the combination of which constitutes "environmental data." The first display positioning information includes conflicting data (e.g., as between the data from the head tracking cameras and the data from the IMU) as a result of being collected while the first environment moves relative to the second environment. A determination is also made that a hologram is to be visually placed within an MR scene. This placement is to occur at a fixed position relative to either one of the first or second environments based on the environmental data.

Upon determining that the hologram is to be visually placed within the MR scene at the fixed position relative to the first environment, at least some of the second display positioning information is selectively filtered out from the environmental data. Consequently, when the environmental data is used during a placement operation in which the hologram is visually placed at the fixed position relative to the first environment, at least some of the second display positioning information is excluded, isolated, or refrained from being considered during the placement operation, such that it is unlikely to cause a conflict with the first display positioning information.

Alternatively, upon determining that the hologram is to be visually placed within the MR scene at the fixed position relative to the second environment, at least some of the first display positioning information is selectively filtered out from the environmental data. Consequently, when the environmental data is used for placing the hologram at the fixed position relative to the second environment, at least some of the first display positioning information is excluded, isolated, or refrained from being considered during the placement operation, such that it is unlikely to cause a conflict with the second display positioning information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
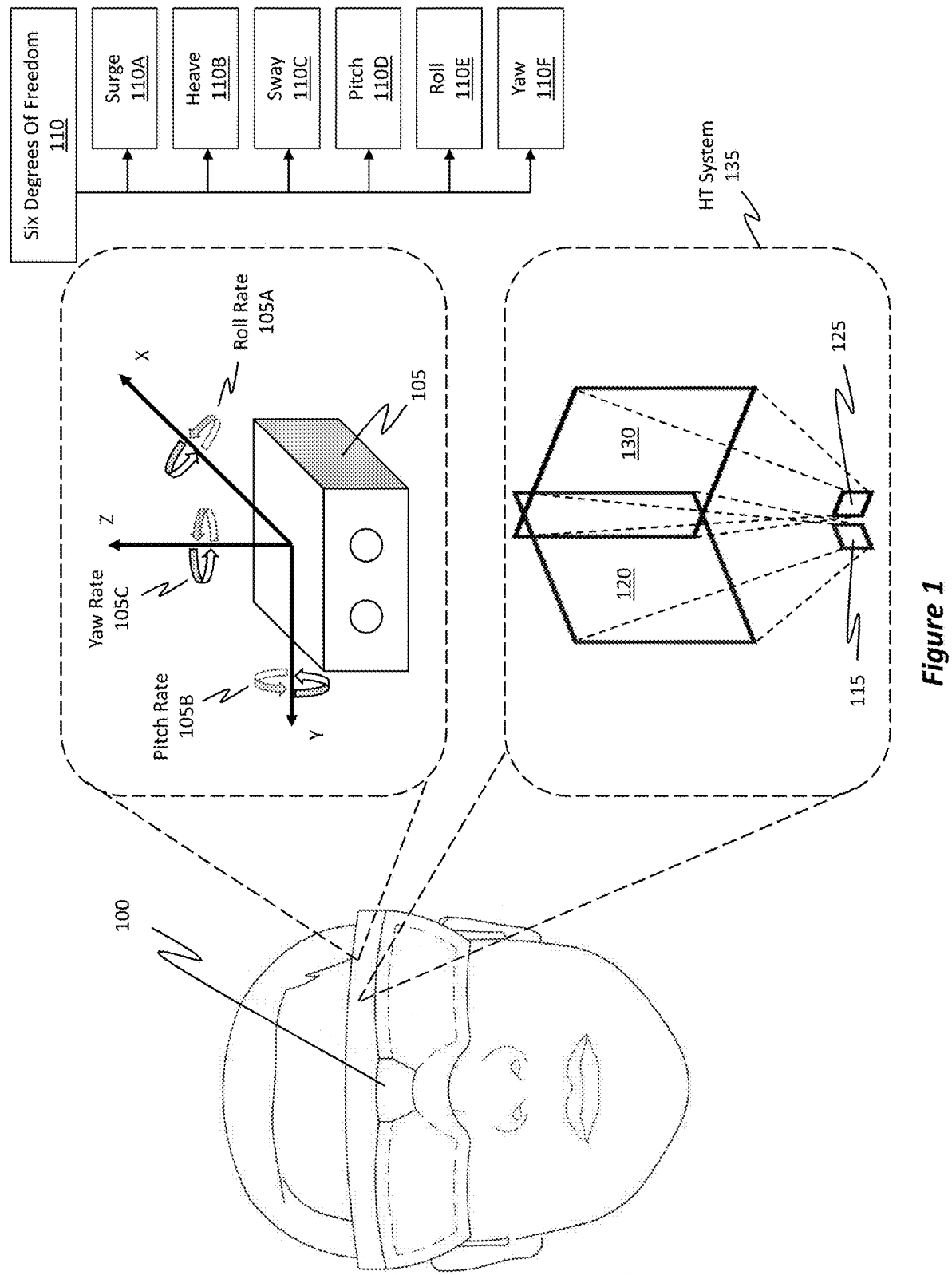
FIG. 1 illustrates an example of a head-mounted system/device (HMD) that includes one or more inertial measurement unit(s) (IMU) and one or more head tracking camera(s).

Disclosed embodiments relate to mixed-reality (MR) systems, devices and methods that can be used to help selectively control display positioning information (aka sensor data for display stability) that is obtained and used to facilitate the presentation and stabilization of holograms positioned/rendered within MR scenes. This stabilization may occur even when certain position data, which is used for the visual placement, has internal conflicts as a result being collected while the MR device is concurrently positioned within a plurality of different environments that move relative to each other.

In some embodiments, a first and second environment are identified, where the first environment is moving relative to the second environment. Display positioning information is obtained for both of the environments (e.g., first and second display positioning information, collectively referred to as "environmental data"), but the first display positioning information has conflicting information as a result of being collected while the first environment moved. A determination is made that a hologram is to be visually placed within an MR scene at a fixed position relative to either one of the first or second environments.

When the hologram is to be placed relative to the first environment, the embodiments selectively filter out at least some (and potentially all) of the second display positioning information from the environmental data. Consequently, at least some of the second display positioning information is excluded, isolated, or refrained from being considered during a hologram placement operation.

Alternatively, when the hologram is to be placed relative to the second environment, the embodiments selectively filter out at least some (and potentially all) of the first display positioning information from the environmental data. Consequently, at least some of the first display positioning information is excluded, isolated, or refrained from being considered during the hologram placement operation.

It should be noted that the disclosed embodiments are able to place any number of holograms in the MR scene. Furthermore, the disclosed embodiments can simultaneously perform both of the filtering operations discussed above. As such, holograms may be placed in the first environment and other holograms may be simultaneously placed in the second environment. There is no limit on the number of holograms that may be visually placed in the different environments.

Technical Improvements, Benefits, And Advantages

The disclosed embodiments improve the technical field in many ways. For instance, as described earlier, traditional MR systems face many problems when attempting to fixedly place a hologram in a moving environment. These problems arise because the data acquisition devices (e.g., IMUs, HT cameras, etc.) on the HMDs produce conflicting information. Specifically, it is often the case that the IMU data conflicts with the HT camera data. Because of these conflicts, the resulting hologram tends to drift or migrate away from its placement location even though it was supposed to remain at a fixed, locked, stationary, or tethered position. The concept of being "fixed" will be described in more detail later, but it generally refers to the concept of holograms being positioned at a locked or unmoving location relative to an environment as opposed to holograms being positioned relative to the user's head or HMD. In other words, the holograms remain stationary relative to the environment even when the user's head or HMD moves. A real-world example of a "fixed" placement is that of a billboard next to a highway. Regardless of how a driver drives his/her car or moves his/her head, the billboard will remain fixedly disposed at the same location. The same concept can be applied to placing virtual images/holograms at fixed locations, as will be described in more detail later.

The disclosed principles can be practiced to eliminate undesired drifting or migrating conditions by selectively and intelligently filtering out some, or even all, of certain selected portions of the collected data, which includes IMU data and HT camera data. For instance, some of the IMU data and/or some of the head tracking data may be filtered. In some cases, holograms can be locked to an expansive world-like environment (e.g., perhaps a runway underneath a plane or perhaps a building enveloping an elevator) while in other cases the holograms can be locked to more local or smaller environments (e.g., perhaps the cockpit of the plane on the runway or perhaps the inside of the elevator in the building).

By performing these selective filtering operations and other processes, the disclosed embodiments eliminate the undesired drifting conditions described above. As such, the disclosed embodiments provide a more enjoyable user experience because the users will be presented with holograms that behave in a repeatedly predictable and stable manner. Accordingly, by improving the stability of the holograms, the users' interactions with the MR device will be improved.

The disclosed embodiments also operate to improve the processing of the MR device itself. Specifically, by reducing the occurrence of hologram drift, the disclosed embodiments will end up performing fewer corrective actions to reposition the hologram to be at its correct location. Less corrective actions means that the MR device will use less of its resources and power, thereby resulting in improved resource and power efficiencies. Accordingly, the disclosed embodiments are highly beneficial and bring about substantial improvements to the field, as more fully described below.

Mixed-Reality (MR) Devices

FIG. 1 illustrates an example HMD 100 that is included as a part of an MR device (which will be illustrated later in connection with FIG. 15). The descriptions "MR device" and "MR system" can be used interchangeably with one another. In some cases, HMD 100 is itself considered as an MR device. Therefore, references to HMDs, MR devices, or MR systems generally relate to one another and may be used interchangeably.

In accordance with the disclosed principles, HMD 100 is able to stabilize the visual placement of any number of holograms (e.g., 1, 2, 3, 4, 5, 10, 20, 30, 40, 50, or more than 50 holograms) rendered by the display of HMD 100. This stabilization may occur even when certain position data, which is used for the visual placement, has conflicts or conflicting information as a result of it being collected while the HMD 100 was operating in a moving environment.

HMD 100 is shown as including an IMU 105. IMU 105 is a type of device that measures force, angular adjustments/rates, orientation, acceleration, velocity, gravitational forces, and sometimes even magnetic fields. To do so, IMU 105 may include any number of data acquisition devices, which include any number of accelerometers, gyroscopes, and even magnetometers.

IMU 105 can be used to measure a roll rate 105A, a pitch rate 105B, and a yaw rate 105C. It will be appreciated, however, that IMU 105 can measure changes in any of the six degrees of freedom 110. Six degrees of freedom 110 refers to the ability of a body to move in three-dimensional space. As an example, suppose HMD 100 is operating in the cockpit of an airplane rolling along a runway. Here, the cockpit may be considered as a "first" environment and the runway may be considered as a "second" environment. Furthermore, the first environment is moving relative to the second environment. Regardless of whichever environment HMD 100 is operating within, the movements of one environment relative to another environment (as recorded or monitored by at least some of HMD 100's data acquisition devices) can be detected or measured in any one or more of the six degrees of freedom 110.

Six degrees of freedom 110 include surge 110A (e.g., forward/backward movement), heave 110B (e.g., up/down movement), sway 110C (e.g., left/right movement), pitch 110D (e.g., movement along a transverse axis), roll 110E (e.g., movement along a longitudinal axis), and yaw 110F (e.g., movement along a normal axis). Accordingly, IMU 105 can be used to measure changes in force and changes in movement, including any acceleration changes of HMD 100. This collected data can be used to help determine a position, pose, and/or perspective of HMD 100 relative to its environment. To improve the position and pose determinations, the data generated by IMU 105 can augment or supplement data collected by a head tracking (HT) system.

FIG. 1 also shows a first HT camera 115, with its corresponding field of view (FOV) 120 (i.e. the observable area of HT camera 115, or rather the observable angle through which HT camera 115 is able to capture electromagnetic radiation), and a second HT camera 125, with its corresponding FOV 130. While only two HT cameras are illustrated, it will be appreciated that any number of HT cameras may be used on HMD 100 (e.g., 1 camera, 2, 3, 4, 5, or more than 5 cameras). Furthermore, these cameras may be included as a part of a HT system 135 implemented on HMD 100.

HT cameras 115 and 125 can be any type of HT camera. In some cases, HT cameras 115 and 125 may be stereoscopic HT cameras in which a part of FOVs 120 and 130 overlap with one another to provide stereoscopic HT operations. In other embodiments, HT cameras 115 and 125 are other types of HT cameras. In some cases, HT cameras 115 and 125 are able to capture electromagnetic radiation in the visible light spectrum and generate visible light images. In other cases, HT cameras 115 and 125 are able to capture electromagnetic radiation in the infrared (IR) spectrum and generate IR light images. In some cases, HT cameras 115 and 125 include a combination of visible light sensors and IR light sensors. In some cases, HT cameras 115 and 125 include or are associated with depth detection functionalities for detecting depth in the environment.

With regard to head tracking, HT system 135 constitutes an "inside-out" HT system because HT cameras 115 and 125 are mounted or physically disposed on HMD 100 and are looking away from HMD 100. An "inside-out" HT system tracks or interpolates the position of an HMD (e.g., HMD 100) by monitoring the HMD's position and pose relative to its surrounding environment. This interpolation is accomplished by causing the HT system to identify anchor or reference points in the surrounding environment. "Anchor points" are points or objects that are identified as being highly stable or that satisfy a stability threshold. Examples include a handrail, a doorframe, an instrument panel, or even an overhead light fixture. The HT system then derives the HMD's position and pose based on perspectives identified within images generated by the HT system. To clarify, the HT system captures images of the anchor points. By analyzing the images, the HT system can identify a perspective between the HT system's cameras and the anchor points. This perspective enables the HT system to then derive its position and pose relative to the anchor points.

As will be discussed in more detail later, a head tracking system, in some case, uses both IMU data and Head Tracking cameras to compensate for movements of the user's head position. The IMU acts very fast and is useful for a frame by frame correction. Sometimes, however, it accumulates error. To prevent a large accumulation of error, the disclosed embodiments also use the Head Tracking cameras to provide an additional input and to ensure that the display is locked to the environment. In some cases, a Kalman filter is used to combine these two sensor inputs to provide better correction than what could be done with a single sensor alone.

Accordingly, HT system 135 can perform head tracking by locking onto objects or points identified as being anchor or reference objects. Each time HT cameras 115 and 125 capture an image of the surrounding environment, HT system 135 analyzes the images to detect the anchor points/objects. Analyzing the images enables HT system 135 to determine the perspective, position, or pose of the HMD 100 relative to specific anchor points/objects and relative to an entire surrounding environment.

In contrast to an "inside out" system, an "outside-in" tracking system uses cameras that are mounted in the environment and that are pointed toward the HMD. In this manner, inside-out head tracking systems are distinguished from outside-in head tracking systems.

Accordingly, HMD 100 is able to use display positioning information generated by IMU 105 and display positioning information generated by HT system 135 in order to determine HMD 100's position and pose. This position and pose information will then enable HMD 100 to accurately render a hologram within an MR scene provided by HMD 100. For instance, if a hologram is to be fixedly displayed on a wall of a room, then the position and pose of HMD 100 are used during the hologram's placement operation to ensure that the hologram is rendered/placed at the proper wall location.

More specifically, to complete the hologram placement operation, the information from the HT cameras and the information from the IMU(s) can be combined using a Kalman filter to provide robust head tracking position and pose estimation and to perform hologram placement using the position and pose information. As used herein, a "Kalman" filter is a type of combining algorithm in which multiple sensor inputs, which were collected over a defined time period and which were collected using the IMU(s) and HT cameras, are combined together to provide more accurate display positioning information than that which could be achieved by either sensor alone. This combination may occur even in the face of statistical noise and/or other inaccuracies. This combined data is what is used during hologram placement.

Unfortunately, in some cases, the display positioning information provided by IMU 105 is in conflict with the display positioning information provided by HT cameras 115 and 125, such as when the HT system 135 is located within multiple environments that move relative to each other. Consequently, the combined data generated using the Kalman filter will have conflicts, and the resulting hologram will experience drift and be unstable within the MR scenes rendered by the corresponding MR system.

The disclosed embodiments can be used to help improve hologram placement and stability by improving how IMU position data is selectively filtered and used in conjunction with HT position data.

Example Method(s) for Improving Hologram Placement Stability

The following discussion now refers to a number of method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
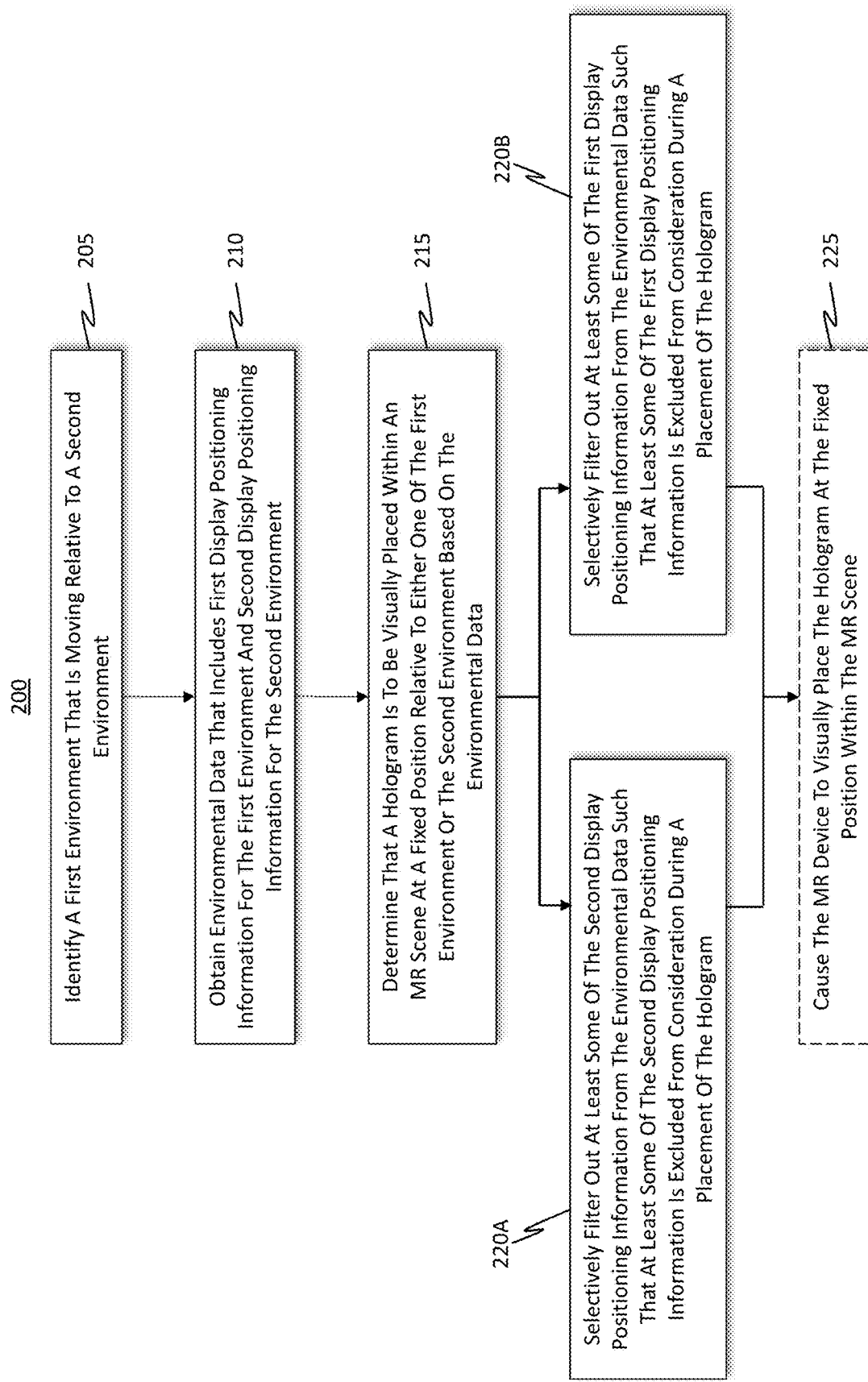
FIG. 2 illustrates a flowchart of an example method for stabilizing the visual placement of a hologram within an MR scene by an MR device/system. This stabilization can occur even when certain position data, which is used for the visual placement, has conflicts as a result of being collected while the MR device was operating in a moving environment.

FIG. 2 illustrates a flowchart associated with an example method 200 for improving how holograms are visually placed/rendered in an MR scene that is provided by an MR device. This MR device may be configured in the manner described in FIG. 1. That is, HMD 100, which can be considered as an MR device, is able to perform the method acts described in reference to method 200.

Initially, as shown, the method 200 includes an act 205 of identifying a first environment (e.g., perhaps a cockpit of an airplane moving on runway or perhaps an elevator moving in a building) that is moving relative to a second environment (e.g., perhaps the runway or perhaps the building). In some cases, first environment is considered as a "moving" environment or as a "dynamic" environment. In some cases, second environment is considered to be a "stationary" environment, a "non-moving" environment, or a "static"

environment. That said, it will be appreciated that in some embodiments, the second environment is also a moving environment (e.g., consider a cart driving on an aircraft carrier located on the ocean). The terms "first" and "second" should be interpreted broadly to include any kind of environment, regardless of whether it is moving or stationary.

Figure 3:
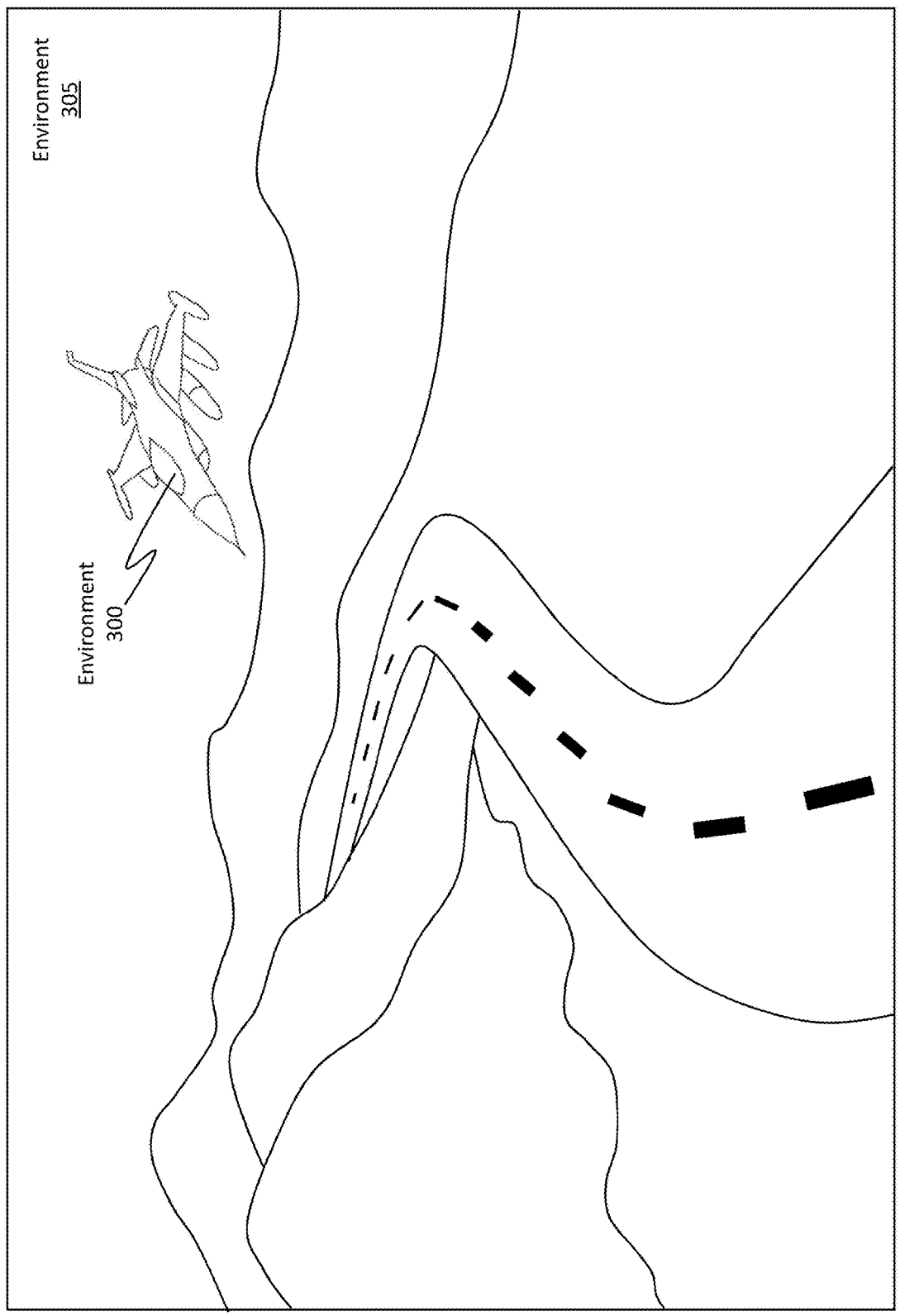
FIG. 3 illustrates an example scenario showing how one environment (e.g., a cockpit of a plane) can move relative to another environment (e.g., the earth).

With regard to act 205, FIG. 3 illustrates one example scenario in which two separate environments are illustrated. Specifically, FIG. 3 shows environment 300 in the form of a cockpit of an airplane while environment 305 is in the form of the earth. In this regard, environment 300 is inside of a moving unit (e.g., an airplane) and environment 305 is a real-world environment through which the moving unit is moving.

Here, environment 300 is representative of the first environment, and environment 305 is representative of the second environment. From FIG. 3, it is apparent that environment 300 is moving relative to environment 305. That is, the cockpit of the airplane is moving through the air while the earth is relatively motionless. For the purposes of this disclosure, earth will be considered as a stationary body even though it is rotating and revolving through space at a fast rate. To clarify, earth should be considered as a stable, non-moving frame of reference relative to any of the other disclosed environments.

Figure 4:
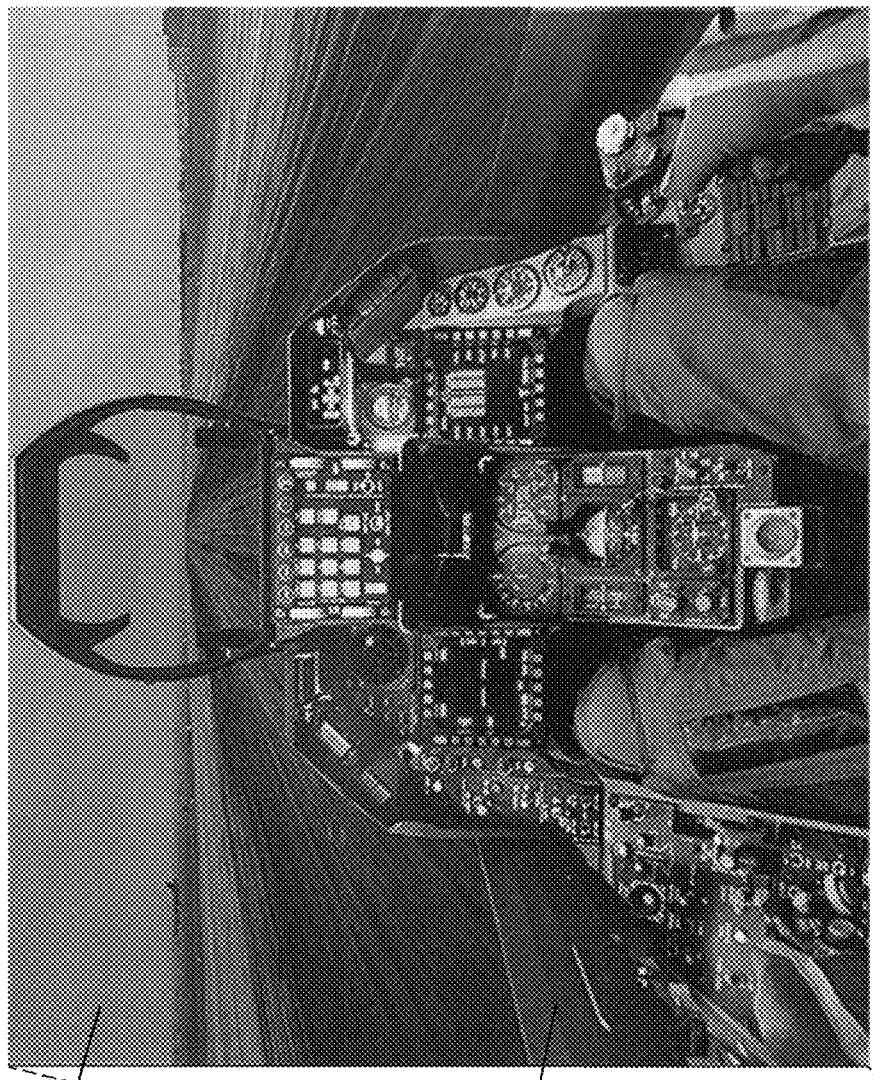
FIG. 4 more fully illustrates the differences between the cockpit environment and the outside earthly environment (e.g., a runway).
Figure 4:
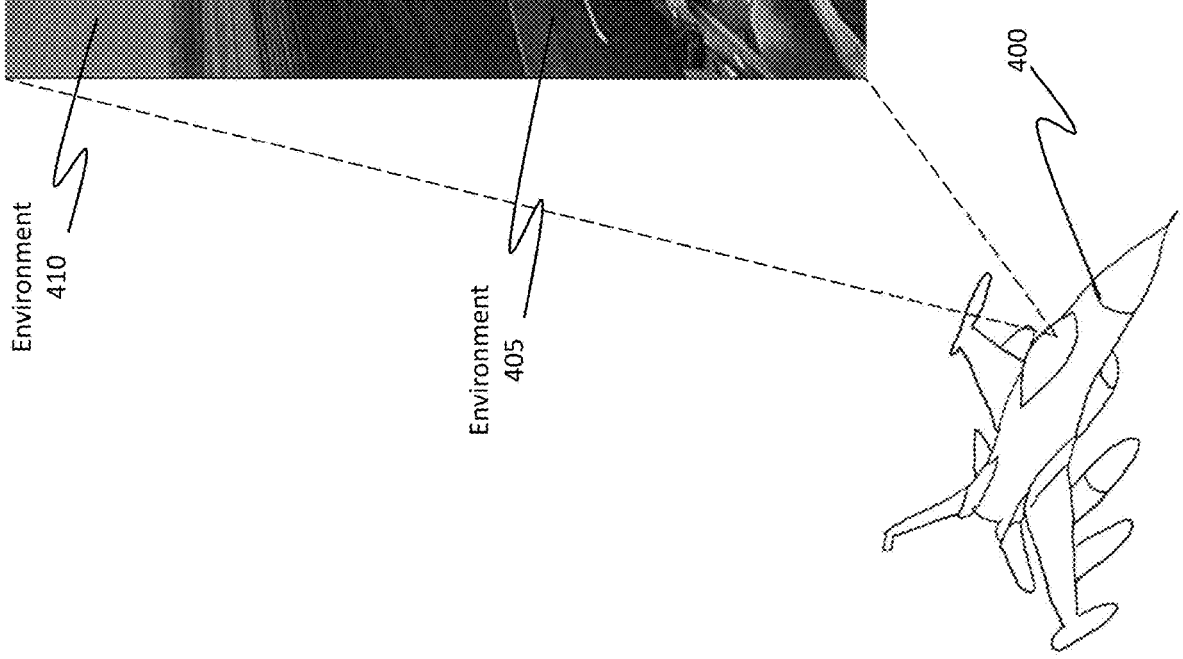

Also, with regard to act 205, FIG. 4 provides additional clarity regarding how one environment can move relative to a second environment. FIG. 4 shows an airplane 400, which is representative of the airplane shown in FIG. 3 whose cockpit was labeled as environment 300. FIG. 4 shows environment 405, which more clearly illustrates the cockpit of airplane 400. FIG. 4 also shows environment 410, which is representative of the earth, and in particular a stationary runway on which airplane 400 is moving or running along. From this figure, it will be appreciated that environment 405 is moving relative to environment 410.

Figure 5:
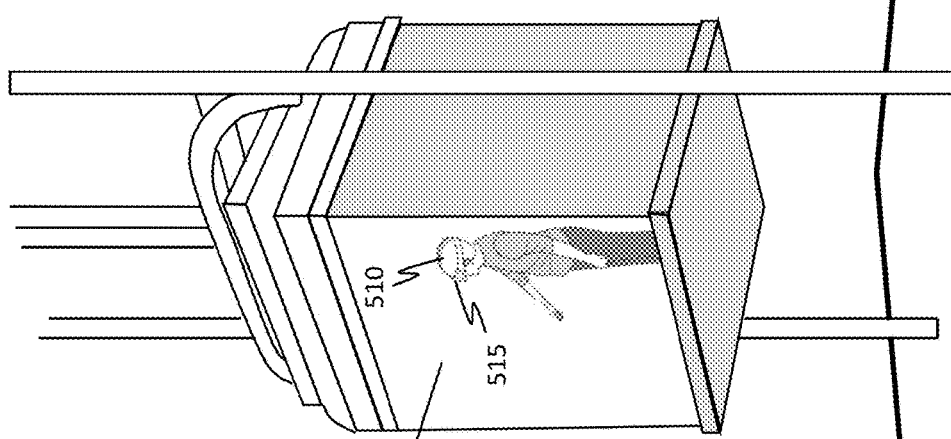
FIG. 5 illustrates another example scenario in which one environment (e.g., an elevator) is moving relative to another environment (e.g., a building or other fixed location/structure on the earth).

FIG. 5 illustrates yet another scenario in which multiple environments are moving relative to one another. Specifically, FIG. 5 shows a first environment 500, which is representative of the first environment referenced in method 200, and a second environment 505, which is representative of the second environment referenced in method 200. First environment 500 is shown as being an elevator, or rather the inside of the elevator. Second environment 505 can be the building surrounding the elevator or even the earth. Here, first environment 500 is able to move relative to second environment 505. For instance, the elevator can move up and down in order to transport people to different floors in the building.

It will be appreciated that other types of environments may be under the scope of the present disclosure. For instance, additional environments include, but are not limited to, submarines in the ocean, oil rigs on the ocean, go-karts on a track, trucks on an aircraft carrier on the ocean, and so on. Accordingly, the disclosed environments should be interpreted broadly to include any type of environment capable of moving relative to another environment.

FIG. 5 shows a user 510 located within first environment 500. User 510 is also shown as wearing an HMD 515. HMD 515 is representative of HMD 100 from FIG. 1 and may perform any of the functions discussed earlier. In this regard, HMD 500 may include one or more IMUs and HT cameras (in some cases, a Head Tracking System is the combination of HT cameras and at least one IMU). The IMUs are able to detect changes in force or movement by detecting force-based changes (e.g., acceleration) while the HT system is able to detect changes in movement by detecting differences between content included in multiple digital images.

Returning to FIG. 2, the illustrated method 200 also includes an act 210 of obtaining first display positioning information for the first environment and second display positioning information for the second environment. In some cases, first display positioning information includes bifurcated, or rather two different sets of information, such as first data and second data, both of which are generated for the first environment. As an example, the IMU data can be considered the first data while the HT camera data can be considered the second data. The combination of the first and second display positioning information constitutes "environmental data," as used herein.

As described above, in some cases, the first display positioning information (which includes the "first data" and the "second data") may be a combination of data collected from multiple different sources or data acquisition devices. For instance, the first data may include data generated by one or more IMUs (e.g., IMU 105 from FIG. 1) while the second data may include data generated by HT cameras of an HT system (e.g., HT system 135 from FIG. 1) disposed on an MR device. As such, the first display positioning information may include data generated from an HMD's IMU(s) and HT system.

Figure 6:
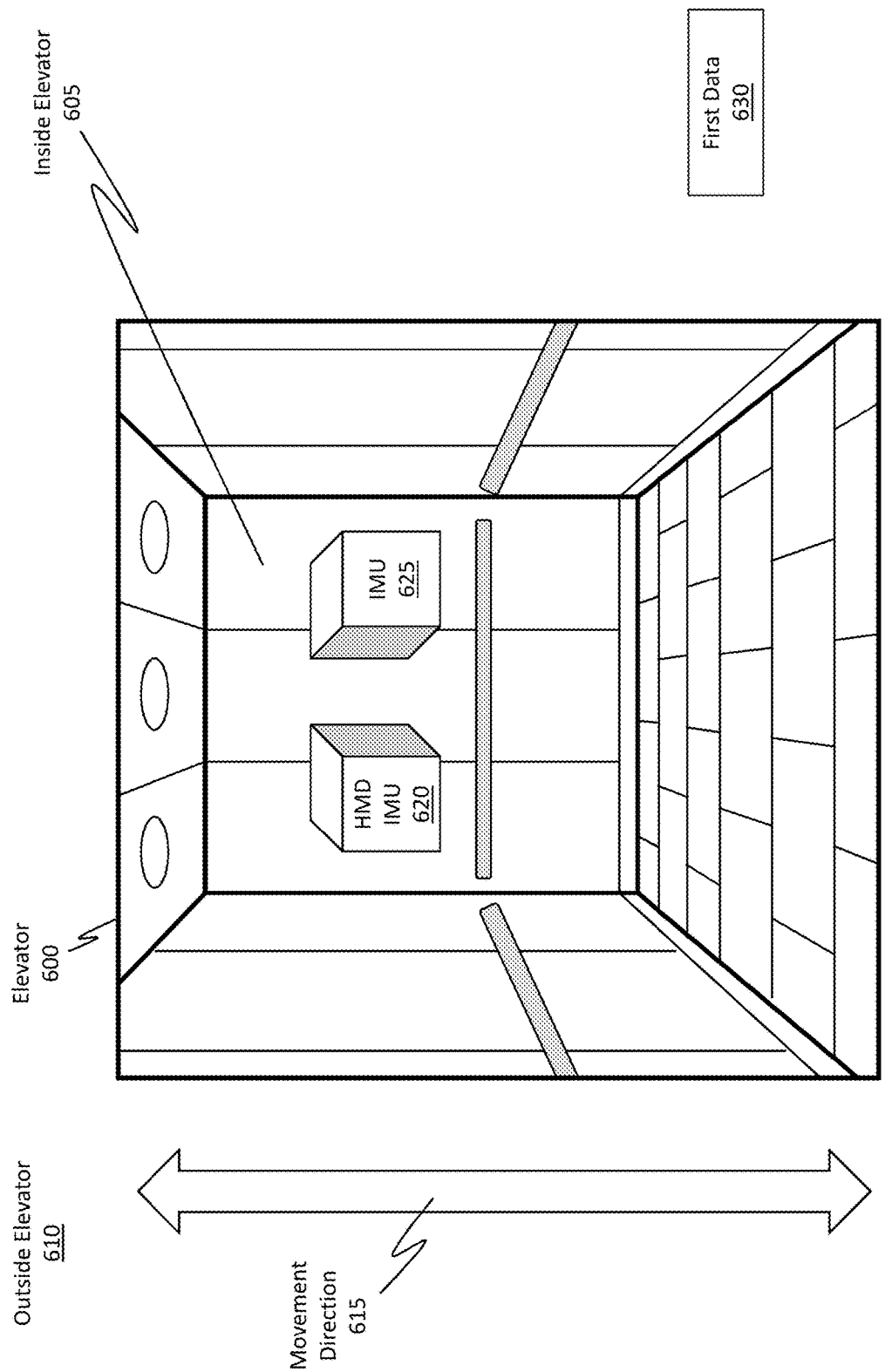
FIG. 6 illustrates how an IMU can be used to monitor changes in position or pose by detecting acceleration changes. When an elevator ascends or descends within an elevator shaft, the IMU detects changes to the elevator's acceleration. The resulting acceleration information can be used by an MR device to determine its location relative to its environment (e.g., the elevator). The information can also be used to help stabilize the placement/rendering of holograms.
Figure 7:
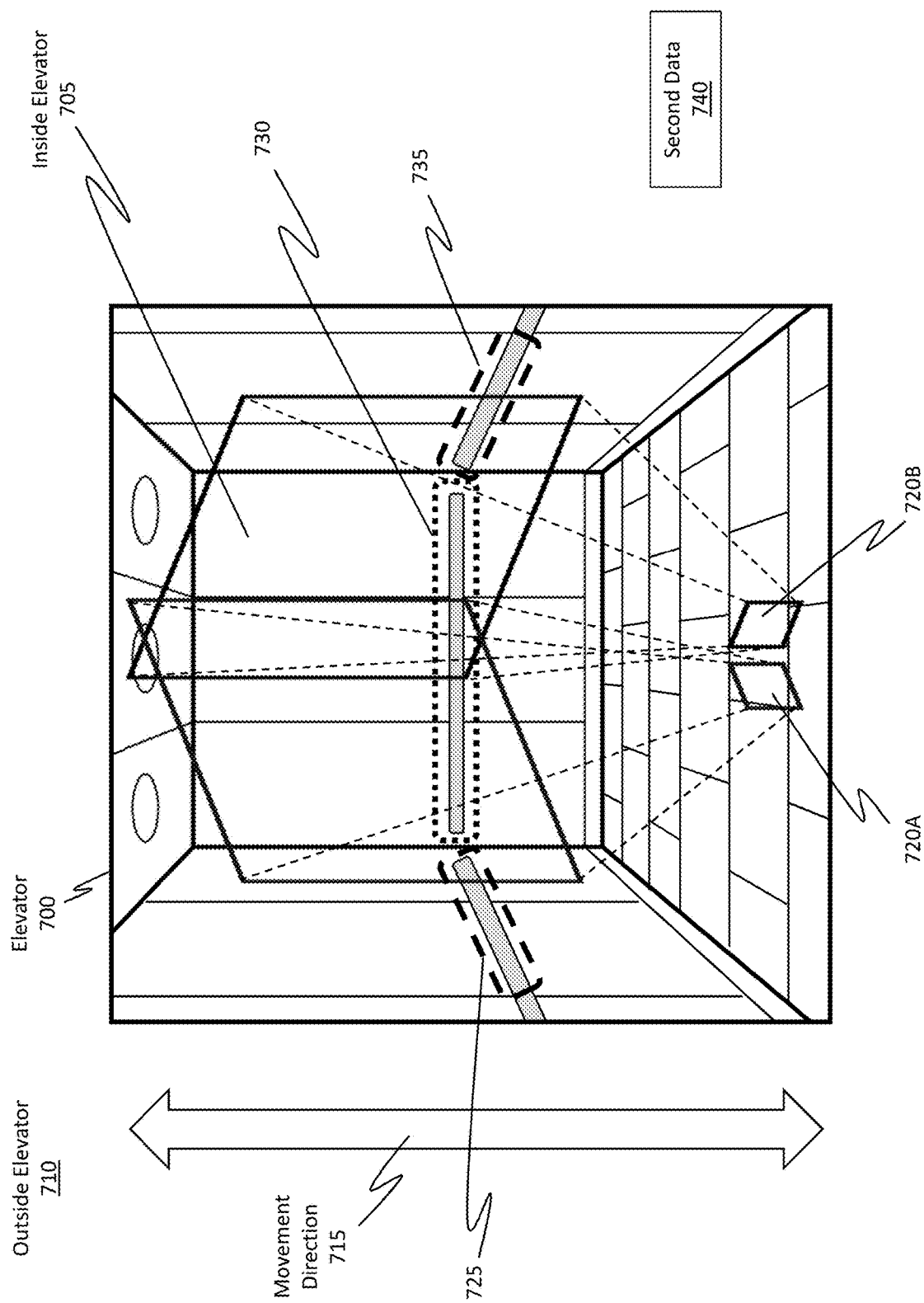
FIG. 7 illustrates how a head tracking system, which includes head tracking cameras, can be used to monitor changes in an MR device's position. By locking on to any number of reference/anchor points (e.g., perhaps the handrails in the elevator), the head tracking system can detect the position of the MR device relative to its environment (e.g., the elevator). This position information can be used by the MR system to stabilize the placement/rendering of holograms.

In some cases, the second display positioning information may also be collected using the HMD's same IMU(s) and HT system. Although the data may have been collected from common devices, the second display positioning information may be classified, tagged, or otherwise marked as being different from the first display positioning information. Additionally, in some cases, the second display positioning information may include data that has been inferred based on a determined state of the second environment. For instance, if the second environment is the earth, then the MR device can infer that the second environment is static, stationary, or non-moving such that the second environment is determined to have no changes in its movement. Therefore, in some embodiments, the display positioning information may be determined based on an understanding or knowledge of a particular environment's state. Additionally, in some cases, the second display positioning information may be collected from data acquisition devices that are not disposed on the HMD. For instance, a separate IMU or a separate camera system may be used to generate or add to the second display positioning information. FIGS. 6 and 7 more fully clarify some aspects related to these features and to method act 210.

FIG. 6 shows an elevator 600 and two environments, namely, inside elevator 605 and outside elevator 610 (e.g., the building or the earth). Inside elevator 605 may be representative of the first environment from method act 205 while outside elevator 610 may be representative of the second environment.

FIG. 6 shows that elevator 600 is able to move up and down, as shown by movement direction 615. As elevator 600 ascends and descends, bodies located inside elevator 605 will experience changes in force, including changes in velocity and acceleration.

An HMD's IMU (e.g., HMD IMU 620) is able to monitor or detect these changes in force. FIG. 6 also shows an additional IMU 625 which will be discussed later. It should be noted that both HMD IMU 620 and IMU 625 can perform any of the operations mentioned in connection with IMU 105 from FIG. 1.

As elevator 600 moves along its movement direction 615, HMD IMU 620 is able to capture data describing the positional changes (e.g., changes in acceleration) of elevator 600 as well as positional changes of the HMD itself. This data is referred to as first data 630, which is representative of the first data mentioned earlier and which is included as a part of the first display positioning information.

Similar to FIG. 6, FIG. 7 shows elevator 700, inside elevator 705, outside elevator 710, and movement direction 715, all of which are representative of their corresponding elements in FIG. 6.

Here, instead of using an IMU to collect display positioning information, FIG. 7 shows that an HT system, which includes HT camera 720A and HT camera 720B, is being used to collect display positioning information. It will be appreciated that HT cameras 720A and 720B are representative of HT cameras 115 and 125 from FIG. 1.

The HT system is able to use its cameras to capture any number of images of inside elevator 705. By identifying one or more anchor or reference points, the HT system can determine the position and pose of its corresponding HMD. FIG. 7 shows three anchor points, namely, anchor point 725 (i.e. the elevator handrail on the left-hand side), anchor point 730 (i.e. the elevator handrail in the middle), and anchor point 735 (i.e. the elevator handrail on the right-hand side). While only three anchor points are labeled, it will be appreciated that the HT system can detect and use any number of anchor points. For example, the HT system can use 4, 5, 6, 7, 8, 9, 10, 20, 30, 40, 50, 100, 200, or more than 200 anchor points when performing head tracking to determine the position and pose of an HMD.

Using HT cameras 720A and 720B, the HT system can generate second data 740, which is representative of the second data mentioned earlier and which is included as a part of the first display positioning information. The combination of first data 630, which was generated by HMD IMU 620, and second data 740, which was generated by an HT system, constitute the "first" display positioning information mentioned in act 210 of FIG. 2. Accordingly, FIGS. 6 and 7 demonstrate how the "first" display positioning information may be obtained.

With regard to the second display positioning information, as described earlier, this information may be generated by any of the IMUs and/or HT cameras used to generate the first display positioning information. In some instances, the second display positioning information may include at least some similar data as the first display positioning information. Additionally, or alternatively, the second display positioning information may be generated by additional IMUs, such as IMU 625 from FIG. 6, and/or any other type of data acquisition system.

Figure 8A:
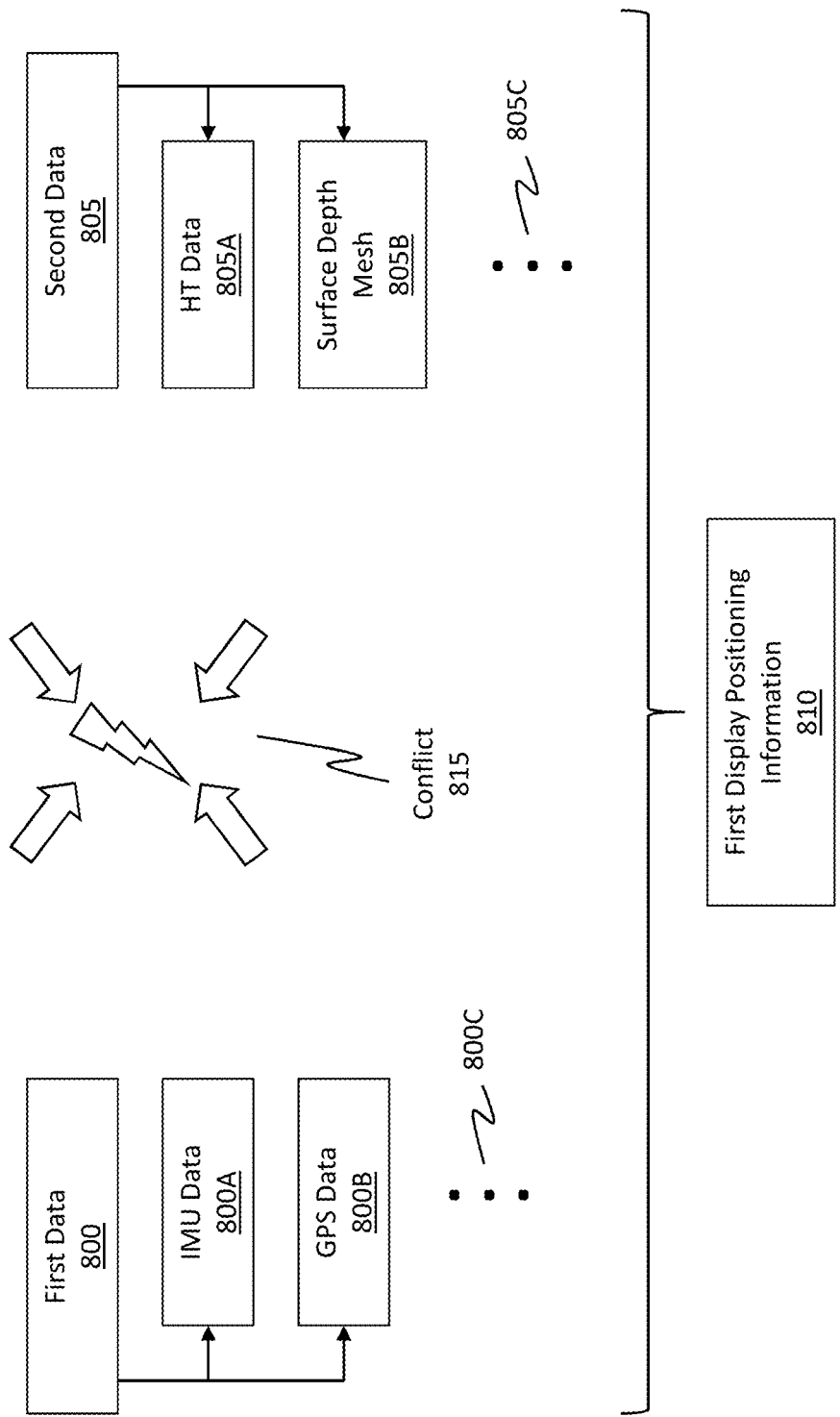
FIG. 8A illustrates how conflicts or discrepancies can occur between IMU data and head tracking data.

In some cases, the first data (e.g., first data 630) and the second data (e.g., second data 740), both of which were collected for the first environment, are in conflict with one another. That is, in some cases, the first display positioning information includes conflicting data as a result of being collected while the first environment moves relative to the second environment. FIG. 8A more fully clarifies this aspect.

In FIG. 8A, first data 800 is representative of first data 630 from FIG. 6. First data 800 was collected using non-camera-based systems. For instance, FIG. 8A shows that first data 800 may include IMU data 800A (e.g., accelerometer data, gyroscope data, magnetometer data, etc.) and global positioning system (GPS) data 800B. The ellipsis 800C demonstrates that first data 800 may include other non-camera-based data (i.e. data collected using devices that are not considered cameras but rather that detect force-based changes). One additional example includes barometric or pressure data. Accordingly, first data 800 may be obtained from an IMU or even from a GPS. It will be appreciated that the first data 800 may include any kind of horizontal position coordinate data, vertical or elevation position coordinate data, and even rotational data.

In contrast, second data 805, which is representative of second data 740 from FIG. 7, was collected using camera-based systems (e.g., HT cameras, depth cameras, etc.). The combination of first data 800 and second data 805 constitutes the first display positioning information 810, which is representative of the first display positioning information from act 210.

Second data 805 may include HT data 805A and surface depth mesh 805B. As used herein, surface depth mesh 805B is generated by any type of depth determining device. Such devices include, but are not limited to, depth cameras, active stereoscopic depth cameras, and even passive stereoscopic depth cameras. Therefore, in some implementations, the first display positioning information 810 includes a surface depth mesh of the first environment. In some embodiments, the first display positioning information 810 is selected based, at least in part, on the surface depth mesh of the first environment. The commonality between these different types of data included in second data 805 lies in the fact that this data was collected using an imaging camera device. The ellipsis 805C demonstrates how second data 805 may have been collected using other types of camera-based systems.

In this regard, an MR device is able to combine visual tracking of key anchor points detected by HT cameras in the form of second data 805 with IMU measurements in the form of first data 800. These disparate data types may be combined using the Kalman filter discussed earlier.

Changes in an environment's frame of reference (e.g., position, momentum, acceleration, etc.) impact the HMD's IMU. Notably, however, if the user's head position does not change (i.e. if the HMD does not move) with respect to the environment, then a discrepancy may occur between the IMU data and the HT camera data. FIG. 8A shows this discrepancy as conflict 815. As an example, when an environment moves (e.g., the elevator goes up or down) but the HMD seemingly stays in a fixed position (e.g., the user wearing the HMD does not move his/her head), then a conflict may occur between the IMU data and the HT camera data. This conflict occurs because the HT cameras are not able to detect the movement of the elevator but the IMU is able to detect the movement.

Using the elevator example, if the elevator does not include any windows, then the HT cameras will not be able to detect the movement of the elevator. Instead, the HT cameras will only detect the inside of the elevator, which does not appear to be moving. As such, the IMU data will be in conflict with the HT camera data because the IMU data identified the elevator as moving while the HT camera did not. Accordingly, in some cases, first display positioning information 810 may include conflicting data as a result of the first environment moving relative to the second environment and as a result of the HT cameras being unable to detect all or some of the movement.

Figure 8B:
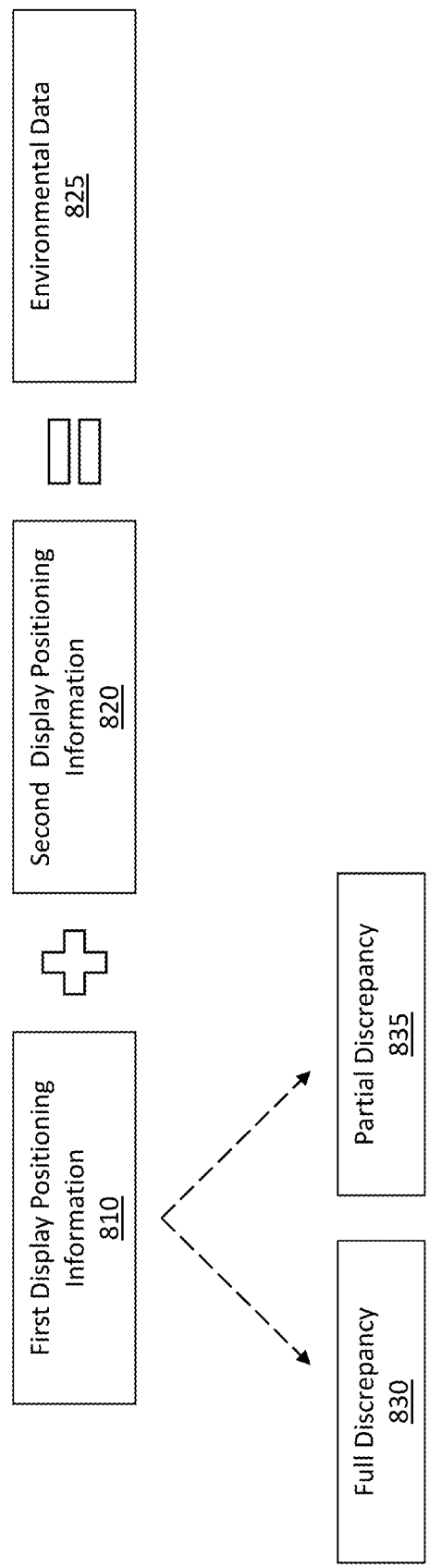
FIG. 8B illustrates that first display positioning information and second display positioning information are collectively referred to as environmental data and that there may be a full or partial discrepancy in the first display positioning information.

FIG. 8B again shows first display positioning information 810. First display positioning information 810 may be combined with second display positioning information 820 (e.g., of the second environment) to form environmental data 825. This data may be retained in a database or other storage medium. FIG. 8B also shows how, in some circumstances, there may be what is called a full discrepancy 830 or a partial discrepancy 835 in the first display positioning information 810 (e.g., a discrepancy as between the first data 800 collected by the IMU and the second data 805 collected by the HT system).

Further detail on a full and a partial discrepancy will be provided later, but by way of a brief introduction, full discrepancy 830 occurs in cases where the HT cameras are entirely unable to capture images of the second environment such that the second environment is not used as a frame of reference for detecting the movement of the first environment. For instance, the elevator example is an example of a full discrepancy between the HT cameras and the IMU. Another example includes movement when the HMD is located in a submarine environment, where there are no windows.

Partial discrepancy 835 occurs in cases where the HT cameras are able to capture images of at least a part of the second environment such that the second environment can operate as at least a partial frame of reference for detecting the movement of the first environment. An example of a partial discrepancy may occur when the elevator has windows, and the HT cameras can capture at least some movement. Another example includes detecting changes when the HMD is located in an airplane's cockpit that has windows showing the outside and that are viewable by the HMD's HT cameras. Further details on full discrepancy 830 and partial discrepancy 835 will be provided later.

Returning to FIG. 2, method 200 additionally includes an act 215 of determining that a hologram is to be visually placed within an MR scene at a fixed position relative to either one of the first environment or the second environment based on the environmental data.

As used herein, a "fixed" position does not necessarily mean 100% fidelity in being "fixed," "stationary," "tethered," "locked," or "un-moving" relative to a position within an environment. That is, a hologram positioned at a fixed location can have some slight changes, fluctuations, minor drift, or minor movements/migration. These permitted movements may be due to (i) animations of the hologram, (ii) movement traits of the hologram, (iii) rendering errors of the hologram or the environment(s), and/or (iv) other processing deviations. In some cases, a hologram placed at a fixed position is referred to as a "world locked hologram," though other descriptions may be used as well. Accordingly, world locked holograms are holograms that are locked at a particular position relative to the environment and/or user.

In a most extreme embodiment, which does not apply to all embodiments, the term "fixed" position (for a hologram corresponding to an environment) is a term of relativity that simply means the position of the hologram (relative to/corresponding to that environment) is relatively more fixed and/or has relatively less deviation in positioning relative to that environment than the deviation in positioning of the hologram relative to a corresponding set of one or more alternative environments. For example, it may be determined that a hologram has or should have a fixed position relative to a first environment but not to a second environment. This so-called "fixed" position or placement may occur even though the positioning of the hologram moves or will move some distance relative to the first environment. As such, a hologram at a fixed position relative to a particular environment may have some degree or amount of movement, but that amount is designed to be less than a corresponding movement of the hologram relative to an alternative environment, which may be contemporaneously moving relative to the hologram (for which the hologram is determined not to have a fixed position).

In some cases, an acceptable threshold movement or deviation is associated with a hologram placed at a fixed position. Consequently, the hologram may be permitted to move or fluctuate up to the threshold movement while still being considered to be located or placed at the fixed position. As a practical example, a hologram can be rendered to look like a billboard in an environment. Here, even though the billboard hologram is placed at a fixed location, the billboard hologram is permitted to have some movement or fluctuation in accordance with the disclosure presented above.

Continuing with FIG. 2, method 200 also includes two alternative method acts, namely acts 220A and 220B. Although method acts 220A and 220B may be performed alternatively to one another, it will be appreciated that these two acts may both be performed, and in some cases, they may be performed concurrently or simultaneously with one another, such as when placing a first hologram in a fixed location relative to a first environment and a second hologram in a fixed location relative to a second environment, while the first and second environments move relative to each other.

As shown, upon determining that the hologram is to be visually placed within the MR scene at the fixed position relative to the first environment, act 220A includes a process of selectively filtering out at least some (and potentially all) of the second display positioning information from the environmental data. In some cases, a portion of the first display positioning information (e.g., some or all of the first data and/or some or all of the second data) may also be filtered out, as will be described later. Consequently, when the environmental data is used during a placement operation in which the hologram is visually placed at the fixed position relative to the first environment, at least some (and potentially all) of the second display positioning information is excluded from consideration during the placement operation. In some embodiments, portions of the first display positioning information may also be excluded from consideration.

Additionally, or alternatively, upon determining that the hologram is to be visually placed within the MR scene at the fixed position relative to the second environment, act 220B includes a process of selectively filtering out at least some (and potentially all) of the first display positioning information from the environmental data. In some embodiments, portions of the second display positioning information may also be selectively filtered out as well. Consequently, when the environmental data is used during the placement operation in which the hologram is visually placed at the fixed position relative to the second environment, at least some (and potentially all) of the first display positioning information is excluded from consideration during the placement operation. In some cases, portions of the second display positioning information may also be excluded from the consideration as well.

Although not explicitly shown in the method 200, it will be appreciated that each of the acts 220A and 220B for selectively filtering display positioning information may additionally include a preceding act of determining that the first and second environment are moving relative to each prior to filtering the display positioning information. Accordingly, the selective filtering may be performed intermittently as the first and second environments correspondingly move (intermittently) relative to each other. For instance, with regard to the elevator embodiment, for ease of explanation, the selective filtering may intermittently occur while the elevator is in motion (upon making the determination the environments are moving relative to each other), but not when the elevator is temporarily held in a stationary position at each floor the elevator stops at in the building. The remaining figures, which will be discussed momentarily, help clarify features and aspects of acts 220A and 220B.

It will also be appreciated that the term selective filtering may include a process of refraining to gather certain/filtered display positioning information (inferential filtering or pre-filtering) and/or the process of extracting/ignoring the display positioning information to be filtered after it is gathered/received (explicit or delayed filtering).

Finally, as shown in method 200, the disclosed methods may also include the act 225 of causing the MR device to visually place the hologram at the fixed position within the MR scene in accordance with the corresponding display positioning information that remains, corresponding to whichever fixed location is selected for the hologram placement (e.g., either in the first environment or the second environment).

Filtering Display Positioning Information for Full Discrepancy Scenarios

FIGS. 5, 6, and 7 represented a scenario involving a full discrepancy (e.g., full discrepancy 830 from FIG. 8B) between the HMD IMU's data and the HT camera's data. This full discrepancy occurred as a result of the HT cameras not being able to capture images of the second environment. Consequently, the second environment could not be used as a frame of reference for the HT cameras in detecting the movements of the first environment.

To overcome a situation involving a full discrepancy, some of the disclosed embodiments utilize an additional IMU to capture additional IMU data. For instance, in addition to the HMD IMU 620 of FIG. 6 (which is included as a part of an HMD), some embodiments additionally use IMU 625 in order to resolve the full discrepancy. Here, the data generated by IMU 625 can be included or classified as a part of the second display positioning information for the second environment—even though it is detecting movements of the elevator 600 (i.e. the first environment). It will be appreciated that just because data is classified as belonging to either one of the first or second environments does not mean that the data is restricted to describing only one of the first or second environments. Here, the second environment is the building or earth, which is considered a stationary body absent of movement. If the data from IMU 625 were not included in the second positional information, then the second display positioning information may be null or empty. As such, the data from IMU 625 is classified as the second display positioning information to facilitate the HMD in resolving a full discrepancy scenario.

In some implementations, IMU 625 is an independent IMU unit. In other implementations, IMU 625 is included as a part of at least one of (i) a smart phone, (ii) a different type of handheld device, or (iii) even an integral part or portion of the second environment. For instance, the IMU can be fixed to a wall, a control console, a fixture, or any other integrated portion of the second environment. Regardless of how it is configured, IMU 625 is located at a location removed from the HMD/MR device.

For instance, IMU 625 may be located within elevator 600 but not on the HMD. As such, IMU 625 is able to independently monitor the force changes of elevator 600 without detecting force changes to the HMD (e.g., occurring from movements of the user's head). As described earlier, in some cases, the previously described second display positioning information for the second environment can include both inferred data based on a determined state of the second environment (e.g., non-movement of the earth or building) as well as the data from IMU 625.

Here, IMU 625 is fixedly positioned to the moving environment (e.g., an elevator, a moving car, an airplane, etc.) while the HMD IMU 620 is fixedly positioned to an HMD located in the moving environment. Data from IMU 625 may be provided to the HMD via any communication channel, such as, but not limited to, Bluetooth, near field communications, wifi, or any other wireless protocol.

The data generated by HMD IMU 620 is subtracted from the data generated by IMU 625 (or vice versa) to provide positional changes describing only movements of the user's head with respect to the environmental frame of reference (e.g., in this case, the elevator). By performing this subtraction, which may be included in the filtering process outlined in act 220A, the embodiments are able to determine only the force-based changes of the HMD without factoring in the force-based changes of the elevator relative to the building. To be more precise, HMD IMU 620 detected changes in movement for both elevator 600 as well as the HMD. It is desirable to remove the elevator 600's movement component and use only the HMD's movement component. Here, similar to the earlier discussion, the elevator 600's movement component can be considered a part of the second display positioning information. As such, it is desirable to filter out that information in accordance with act 220A and rely only on the first display positioning information (which includes the HT camera data and only the subtracted version of the data now describing only the force-based changes to the HMD).

As such, the filtering process described in act 220A may include the subtraction process described above. The force-based changes to the HMD can then be used to augment or supplement the HT camera data to determine position and pose and to place a hologram. That is, because the user is completely enveloped within the first environment (and the second environment is not viewable), the HT cameras will be referenced only to the first environment and not to the second environment. To clarify, the HT camera data is not influenced from the movements of the first environment relative to the second environment, unlike the IMU data which was influenced by the movements. Consequently, in this case, the disclosed embodiments can entirely filter out some or all of the second display positioning information obtained for the second environment (e.g., the force-based movements of elevator 600).

In some additional cases, though not all, some of the first display positioning information may also be filtered. For instance, the subtracted version of the data from HMD IMU 620 may not be needed because the HT cameras (in some cases) may be able to provide a complete or full depiction/rendition of the first environment. For example, in some cases, the HT camera frame rate and/or data rate may be adjusted to be fast enough so as to sufficiently capture and monitor the surrounding environment. As such, the subtracted version of the data from the HMD IMU 620 can be (but is not required to be) entirely filtered and excluded from consideration when the holograms are being placed (such that only the HT camera data is considered). In other words, IMU data does not augment or supplement the HT camera data. It will be appreciated that this is just one example technique, and may be somewhat rare because it is typically more preferred to combine the IMU data with the HT camera data. As such, this embodiment (i.e. the case where only HT camera data is used) may be a rare case. Notwithstanding this rarity, the disclosed embodiments should be interpreted broadly to include this situation as well as the other situations described herein.

In another implementation, the HT camera data and the IMU data may be provided with different weighting scales. For instance, depending on the situation, the HT camera data may be provided a relatively higher weight (such that its impact is higher or such that it is considered relatively more important) while the IMU data may be provided with a relatively lower weight, or vice versa. Determining what weight to provide the HT camera data and the IMU data can be based on a number of different factors. Some factors include, but are not limited to, the type of environments currently at play, the average stability of the HMD, the type of application currently executing on the HMD, the sensor sensitivity of the HT cameras (e.g., frame rate) and/or the IMU, and others as well. Accordingly, in some embodiments, weights may be assigned to the HT camera data and the IMU data.

Accordingly, situations involving a full discrepancy can perform method act 220A and can filter out at least some (and potentially all) of the second display positioning information and potentially can filter out some of the first positioning data (e.g., the subtracted version of the data from the HMD's IMU).

Filtering Display Positioning Information for Partial Discrepancy Scenarios

FIGS. 9, 10, 11, and 12 represent a scenario involving a partial discrepancy (e.g., partial discrepancy 835 from FIG. 8B). The content in these figures corresponds to the content previously shown in FIG. 4. That is, FIGS. 9, 10, 11, and 12 illustrate a cockpit of an airplane moving on a runway.

In this partial discrepancy scenario, HT cameras are able to capture images of the first environment as well as at least some of the second environment. Therefore, in these scenarios, the second environment can act as at least a partial frame of reference for the HT cameras in order to detect the fact that the first environment is moving.

Two scenarios will now be discussed. The first scenario arises when a hologram is to be placed at a fixed position relative to the second environment (e.g., a non-moving, stationary, or static environment, though the second environment may be moving) but a portion of the second environment is occluded. The first scenario causes act 220B of FIG. 2 to be performed.

The second scenario arises when a hologram is to be placed at a fixed position relative to the first environment (e.g., a moving environment), but again a portion of the second environment is occluded. The second scenario causes act 220A of FIG. 2 to be performed.

The cockpit illustration from FIG. 4 will be used to describe both of these scenarios. For instance, the first scenario involves placing a hologram in environment 410 (i.e. the earth environment such that the hologram is a world-locked hologram) while the second scenario involves placing the hologram in environment 405 (i.e. the cockpit such that the hologram is a locally-locked hologram).

Partial Discrepancy and World-Locked Holograms

In the first scenario (causing act 220B to be performed), the disclosed embodiments use full data from the HMD's IMU(s) as well as some, but not all, of the data from the HT cameras. The full data from the HMD's IMU(s) includes both movements of the HMD as well as movements of the first environment (e.g., the airplane). It is also noted that the HT cameras see a combination of points. Some points are referenced to the first environment (e.g., the cockpit) while other points are referenced to the second environment (e.g., the earth).

For this scenario to properly produce fixed holograms in the second environment, it is desirable to use HT camera data that references only the second environment (e.g., the earth) and that does not reference the first environment. To do so, the disclosed embodiments filter some of the HT camera data, where the filtered data corresponds to the first environment. With reference to FIG. 4, it is desirable to retain the HT camera data for environment 410 (i.e. the earth) and to filter the HT camera data for environment 405 (i.e. the cockpit).

In some embodiments, this filtering process is achieved through the additional use of depth cameras disposed on the HMD. These depth cameras are configured to generate a 3D surface mesh of the HMD's environment. As used herein, a 3D surface mesh is a geometric representation or model made up of any number of discrete interconnected faces (e.g., triangles) and/or other interconnected vertices. The combination of these vertices describes the environment's geometric contours, including the contours of any objects within that environment.

In the situation shown in FIG. 4, the 3D surface mesh would include a part corresponding to environment 410 and another part corresponding to environment 405. The 3D surface mesh part corresponding to environment 410 would have depths that are relatively larger than depths included in the 3D surface mesh corresponding to environment 405. This is due to the fact that environment 410 is relatively more remote or further away from the HMD than environment 405. In other words, the cockpit is closer to the HMD than the runway. As such, the filtering process may include filtering out at least some data included in the surface depth mesh of the first or second environments.

The filtering process may also include segmenting or excluding the undesired portions (e.g., in this case the cockpit portions of environment 405). Segmenting ensures that any key anchor or reference points selected by the HT cameras are located only within the second environment (e.g., environment 410) as opposed to being within the first environment (e.g., environment 405). This segmentation process also ensures alignment between the IMU and the HT cameras because both units will be focused only on data associated with the second environment. In some cases, the segmentation process involves the use of machine learning to learn an algorithm that provides binary segmentation of the cockpit environment from the outside surrounding environment. As the cockpit is static for most situations, this region of the HT camera data can be ignored or filtered.

Figure 9:
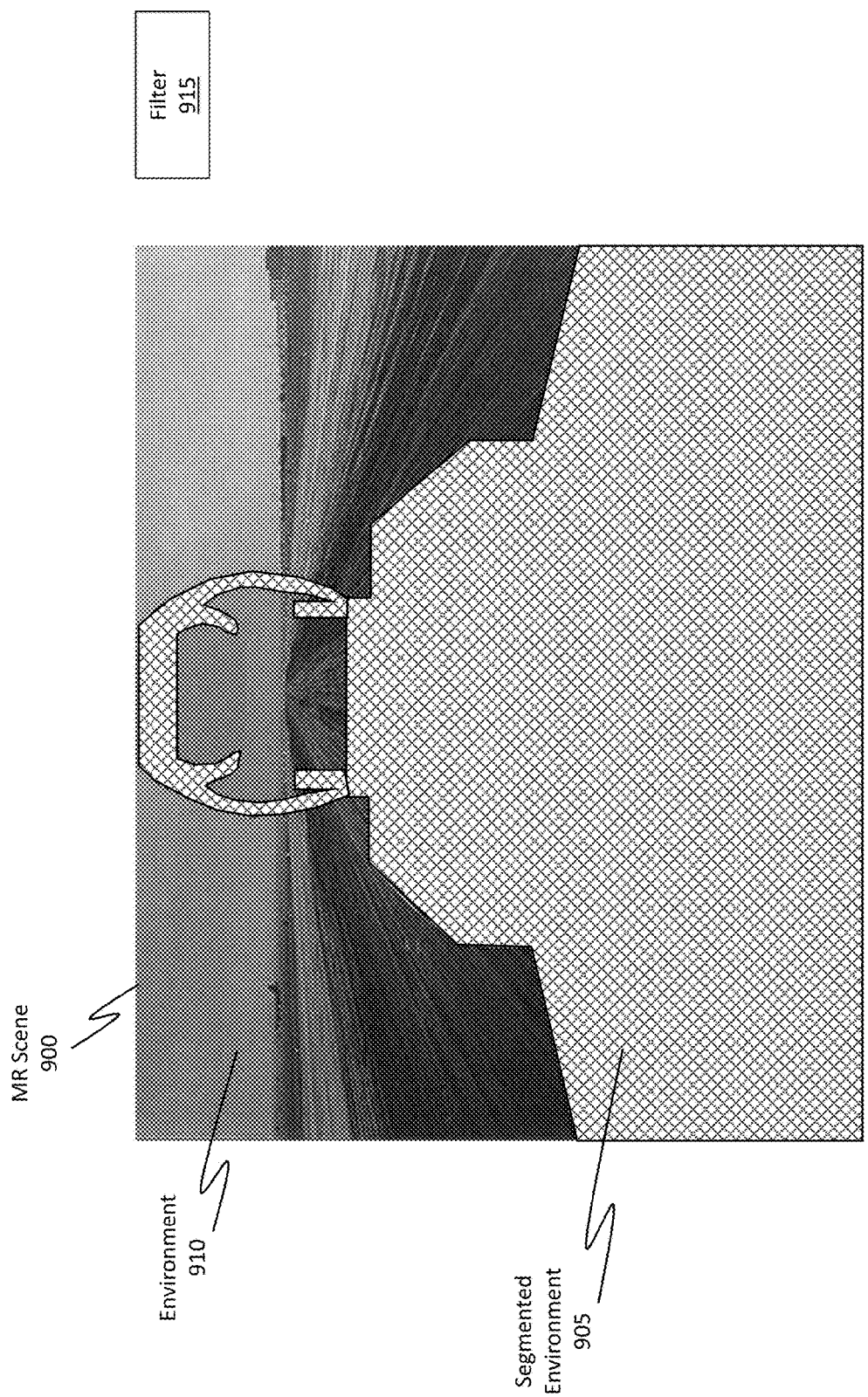
FIG. 9 illustrates an example of how display positioning information for one environment (e.g., a dynamic or moving environment such as the cockpit of a plane, where the plane is moving relative to the earth) can be filtered or excluded (e.g., from the head tracking cameras) so that its corresponding display positioning information is not relied on or considered when placing/rendering holograms.

In the scenario shown in FIG. 9, the data corresponding to the cockpit has been eliminated or filtered so that the cockpit data will not influence holograms placed in the runway environment. Specifically, the HMD's IMU generated data recording the movement of the HMD and the cockpit relative to the runway, and the HT cameras generated data for both the cockpit and the runway.

In this scenario, the embodiments use the full data from the HMD's IMU (which measures both the HMD's movements as well as the cockpit's movements) and combine that data with some, but not all, of the data captured by the HT cameras. That is, some of the HT camera data is filtered out.

FIG. 9 shows an example of this filtering and segmentation process. Specifically, FIG. 9 shows an MR scene 900 that includes segmented environment 905 (i.e. the data that was filtered out) and environment 910. In this context, segmented environment 905 corresponds to the "first" environment that is moving relative to the "second" environment (i.e. environment 910). Also in this context, it is desirable to place a hologram in environment 910 and preclude or prevent the data corresponding to segmented environment 905 from having an impact on that placement operation.

As such, the disclosed embodiments utilize a filter 915 to identify data associated with the cockpit environment (e.g., the identification can be performed using the depth data or surface mesh described earlier). Then, the embodiments use filter 915 to remove that data from consideration, thereby resulting in segmented environment 905. FIG. 9 shows segmented environment 905 with a cross-hatch pattern to visually illustrate how the data corresponding to segmented environment 905 is actually precluded from consideration. In this regard, method act 220B is satisfied because at least some of the first display positioning information (e.g., the cockpit data) is filtered.

Figure 10:
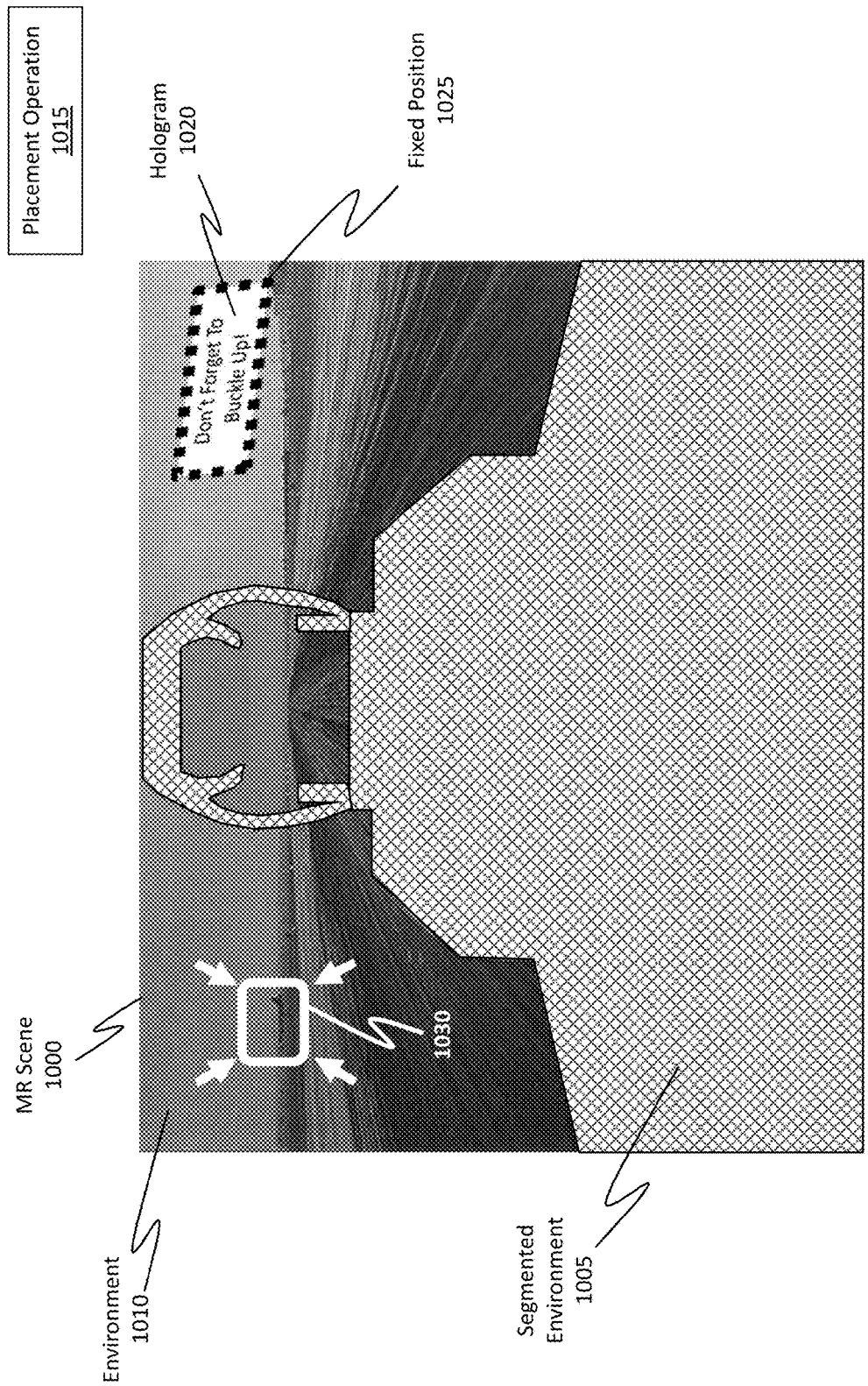
FIG. 10 illustrates an example of a hologram placement operation and illustrates how some display positioning information has been filtered or excluded from (e.g., the head tracking camera) consideration.

FIG. 10 shows a follow-up figure. Similar to FIG. 9, FIG. 10 illustrates an MR scene 1000, a segmented environment 1005, and environment 1010. Here, the embodiments have performed a placement operation 1015 to visually place a hologram 1020 at a fixed position 1025 relative to the environment 1010. Here, hologram 1020 is a virtual image reminding the pilot to "Don't Forget To Buckle Up!"

Another hologram 1030 has also been placed in environment 1010. Hologram 1030 is visually emphasizing the presence of another real-world object in environment 1010. Specifically, hologram 1030 is calling attention (e.g., via use of virtual arrows and a virtual bounding box) to the presence of another plane located near the pilot's plane.

While only two holograms are shown in FIG. 10, it will be appreciated that any number of holograms may be placed within an environment. Additionally, it will be appreciated that holograms 1020 and 1030 may be any type of hologram. As examples only, holograms 1020 and 1030 may be used to visually emphasize real-world objects, they may be used to visually present purely virtual information to a user, and they may even be used to control operations of the HMD. The holograms 1020 and 1030 may have any color, format, or other type of visual presentation.

Furthermore, because environment 1010 is an expansive world-like environment surrounding the cockpit, holograms 1020 and 1030 can be characterized as "world-locked" holograms that are placed at fixed positions.

Partial Discrepancy and Locally-Locked Holograms

Figure 11:
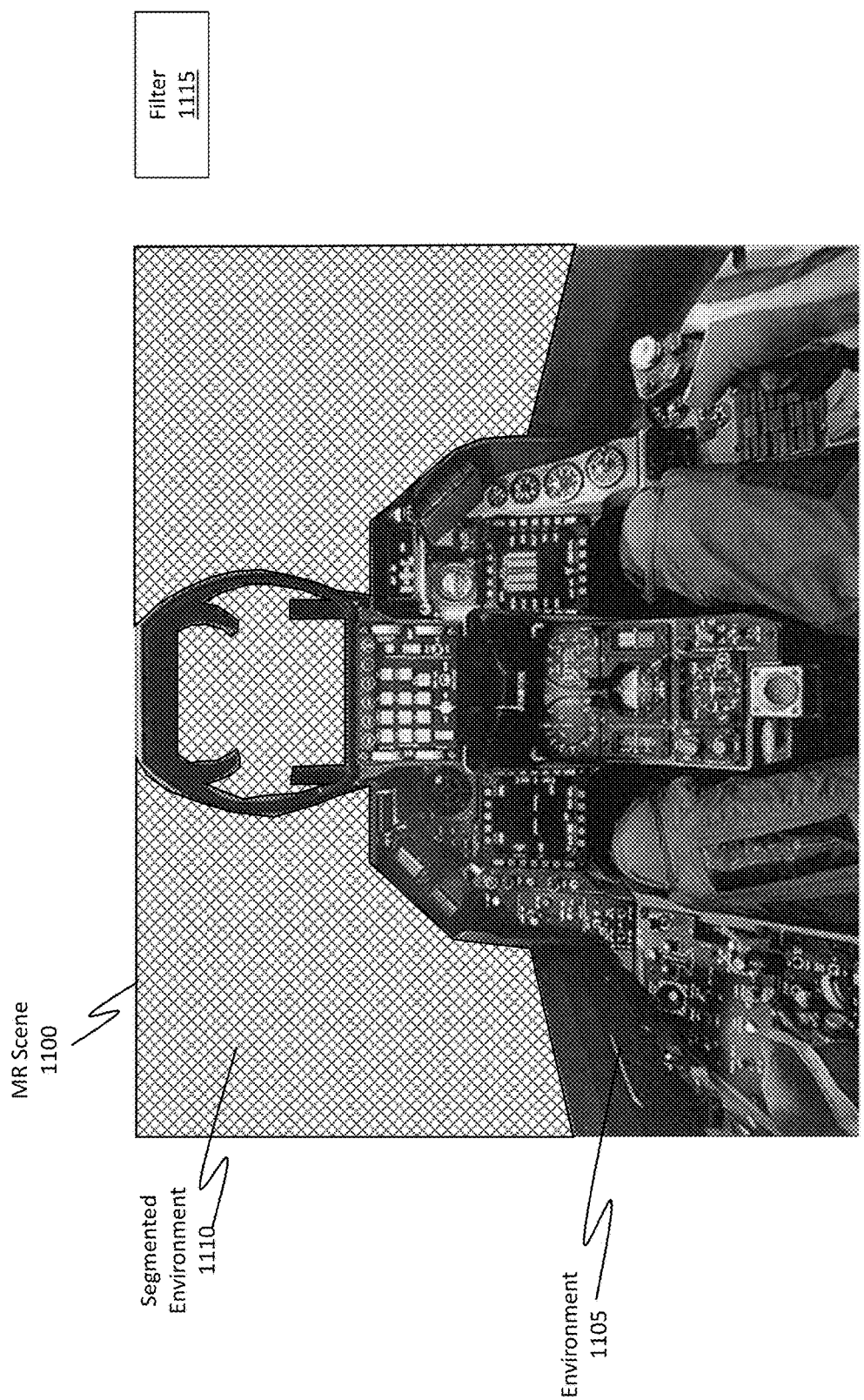
FIG. 11 illustrates an example of how display positioning information for one environment (e.g., a static earthly environment outside the cockpit area of a plane that is moving relative to the earthly environment) can be filtered or excluded (e.g., the head tracking camera) so that its corresponding display positioning information is not relied on or considered when placing/rendering holograms.
Figure 12:
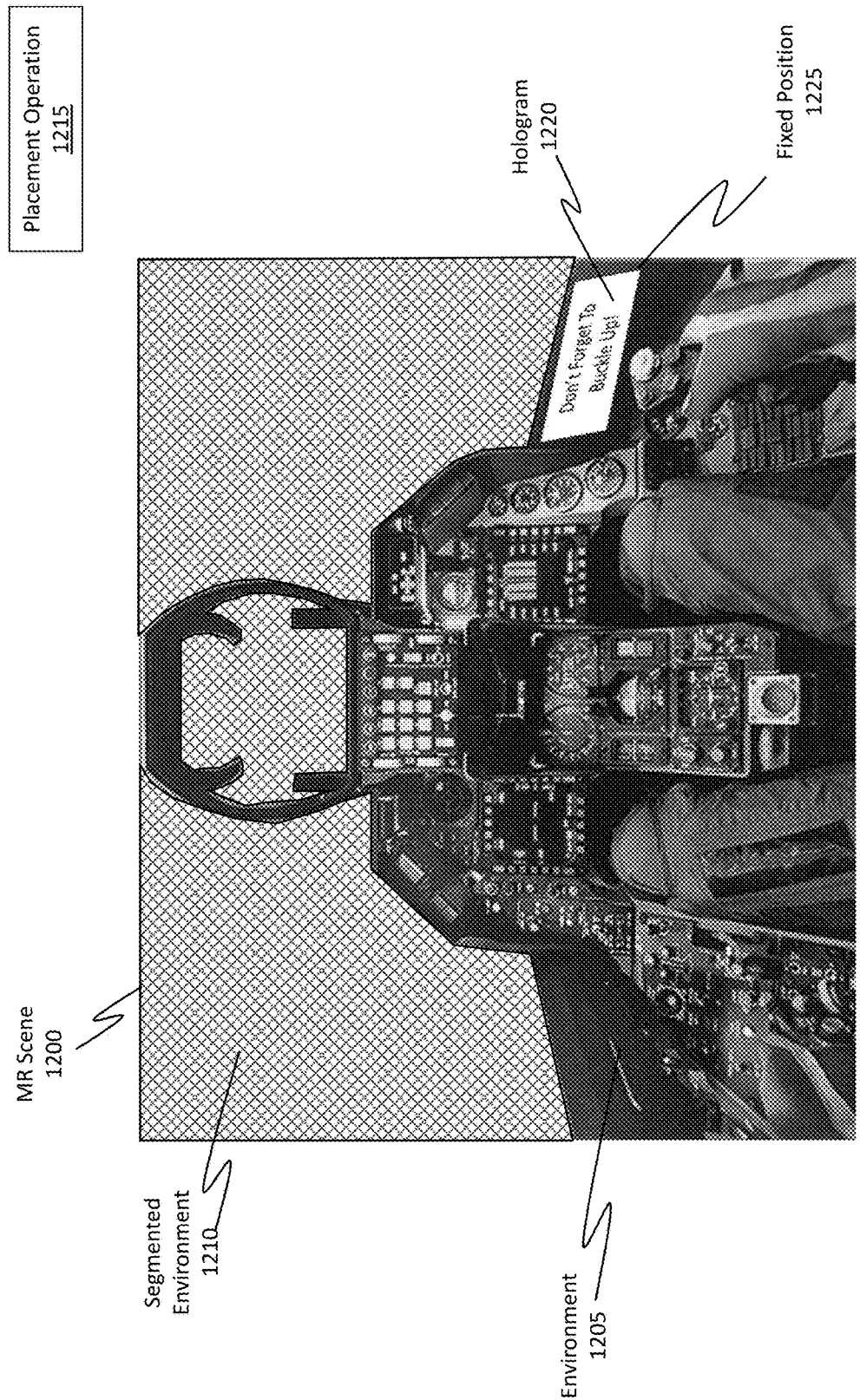
FIG. 12 illustrates an example of a hologram placement operation and illustrates how some display positioning information has been filtered or excluded from consideration.

FIGS. 11 and 12 focus on the second scenario discussed earlier in which a hologram is to be placed at a fixed position relative to the first environment (e.g., a moving environment), but portions of the second environment are occluded. In this regard, the second scenario causes method act 220A to be performed.

FIG. 11 again shows an MR scene 1100, an environment 1105 (i.e. the local cockpit environment that is moving relative to the runway), and a segmented environment 1110 (which corresponded to the runway). Here, it is desirable to place a hologram in the cockpit area (i.e. environment 1105) and prevent the runway environment from influencing the hologram's placement. As such, the embodiments use a filter 1115 to filter out the runway data. Segmented environment 1110 symbolically illustrates that the data for the runway environment has been excluded from consideration. Segmented environment 1110 is shown using a cross-hatch pattern for the symbolism.

FIG. 12 is a follow-up figure showing the hologram placement operation. Specifically, FIG. 12 shows MR scene 1200, environment 1205, segmented environment 1210, and a placement operation 1215. Placement operation 1215 caused a hologram 1220 to be placed at a fixed position 1225 relative to environment 1205 (i.e. inside the cockpit). As shown, hologram 1220 is a reminder hologram reminding the pilot "Don't Forget To Buckle Up!" Therefore, in this situation, the embodiments are able to generate a locally-locked hologram that is placed in the local, moving environment.

Accordingly, there may be times when holograms are to locked to a local environment, such as a vehicle's frame of reference (e.g., the cockpit). For this MR experience to function properly, two steps are typically performed.

First, the HMD's IMU data is subtracted from an IMU placed in the local environment (e.g., the cockpit), or vice versa. Performing this subtraction allows the embodiments to filter out data pertaining to the outside world and to focus only on the data relating to the movements of the HMD.

Second, the HT system segments and excludes from view the data relating to the outside world. This is shown as segmented environment 1210. By combining the correctly-reference IMU data (aka the subtracted version IMU data) with the properly segmented HT camera data, the embodiments can ensure that the hologram will be placed at a locally-fixed location and will not be influenced by the data relating to the outside world, even when the cockpit is moving. As before, machine learning or any other type of segmentation process can be used for placing holograms at locally-fixed locations. Accordingly, this second scenario causes act 220A of FIG. 2 to be performed because at least some of the second display positioning information (e.g., the HT camera data corresponding to the runway and/or the IMU data corresponding only to the force-based changes of the cockpit) is filtered from consideration.

Additional Environments

Figure 13:
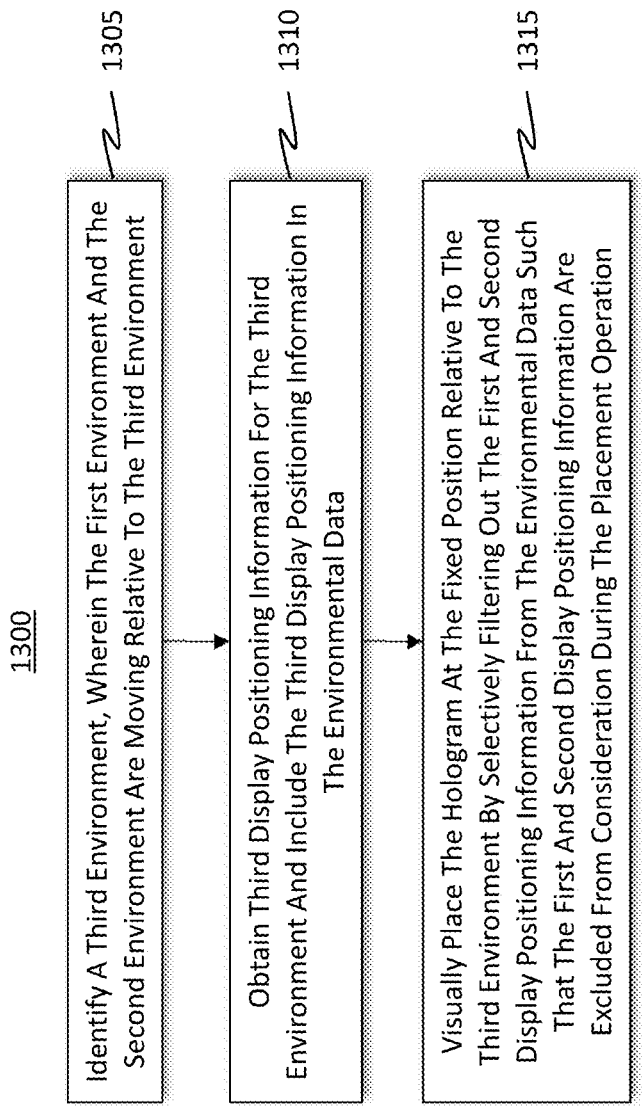
FIG. 13 illustrates a flowchart with acts corresponding to example methods for placing holograms to be rendered by a MR device when the MR device is located within multiple environments concurrently (e.g., three or more), one or more of which may be moving relative to the others.
Figure 14:
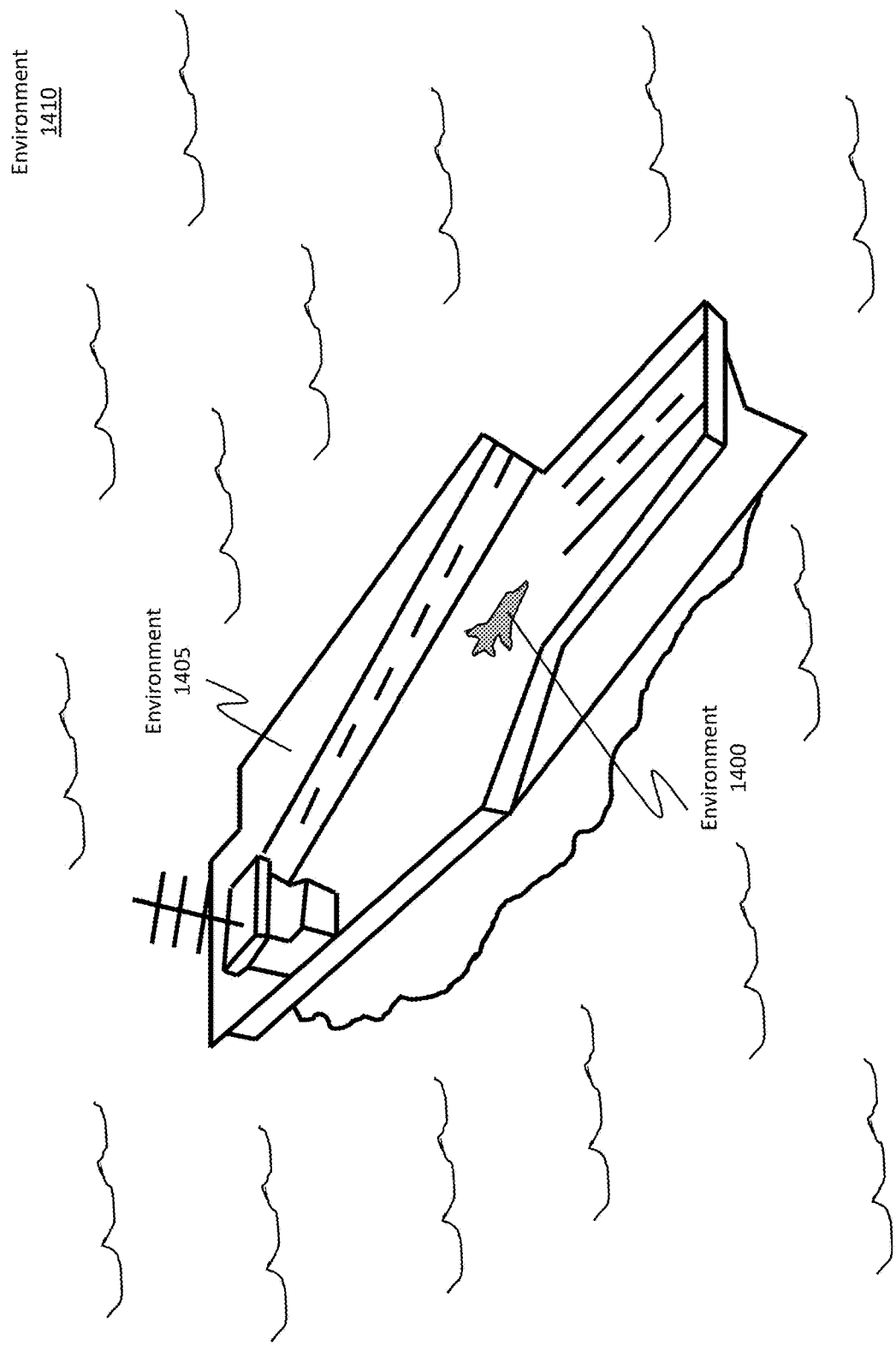
FIG. 14 illustrates a plane positioned on an aircraft carrier, which is positioned in the ocean. Here, the plane constitutes one environment, the aircraft carrier constitutes another environment, and the ocean constitutes yet another environment. Regardless of the number of environments, the embodiments are able to stabilize the placement/display of holograms within an MR scene.

In some cases, more than two environments may be involved. FIGS. 13 and 14 relate to such a scenario. Specifically, FIG. 13 illustrates a flowchart of an example method 1300 for factoring in the movement data from a third environment.

Method 1300 initially includes an act 1305 of identifying a third environment. Here, the first environment and the second environment are moving relative to the third environment.

FIG. 14 illustrates such a scenario. Specifically, FIG. 14 shows a plane moving on an aircraft carrier which itself is moving on the ocean. Environment 1400 (i.e. the plane) is representative of the previously described first environment, environment 1405 (i.e. the aircraft carrier) is representative of the previously described second environment, and environment 1410 (i.e. the ocean) is now the third environment.

Returning to FIG. 13, method 1300 includes an act 1310 of obtaining third display positioning information for the third environment and including the third display positioning information in the environmental data. As such, the environmental data now includes first, second, and third display positioning information. The third display positioning information may be collected in any number of ways, similar to those mentioned earlier. For instance, the third display positioning information may be collected using IMUs, GPSs, cameras, depth cameras, and so on.

Method 1300 then includes an act 1315 where, instead of visually placing the hologram at the fixed position relative to either one of the first environment or the second environment, the hologram is visually placed at the fixed position relative to the third environment. This placement involves selectively filtering out at least some of the first display positioning information and at least some of the second display positioning information from the environmental data. Consequently, when the environmental data is used during the placement operation in which the hologram is visually placed at the fixed position relative to the third environment, at least some of the first display positioning information and at least some of the second display positioning information are excluded from consideration during the placement operation.

Accordingly, the disclosed embodiments are able to improve how holograms are placed within an MR scene. These improvements are achieved, in some cases, by collecting movement data about multiple different environments, at least one of which is moving relative to another one. Then, the embodiments selectively filter out some (or potentially all) of the movement data, depending on which environment the hologram is to be placed within. In doing so, the embodiments are able to ensure that the hologram is positioned at a fixed location and is positioned in a highly stable manner.

Example Computer System(s)

Figure 15:
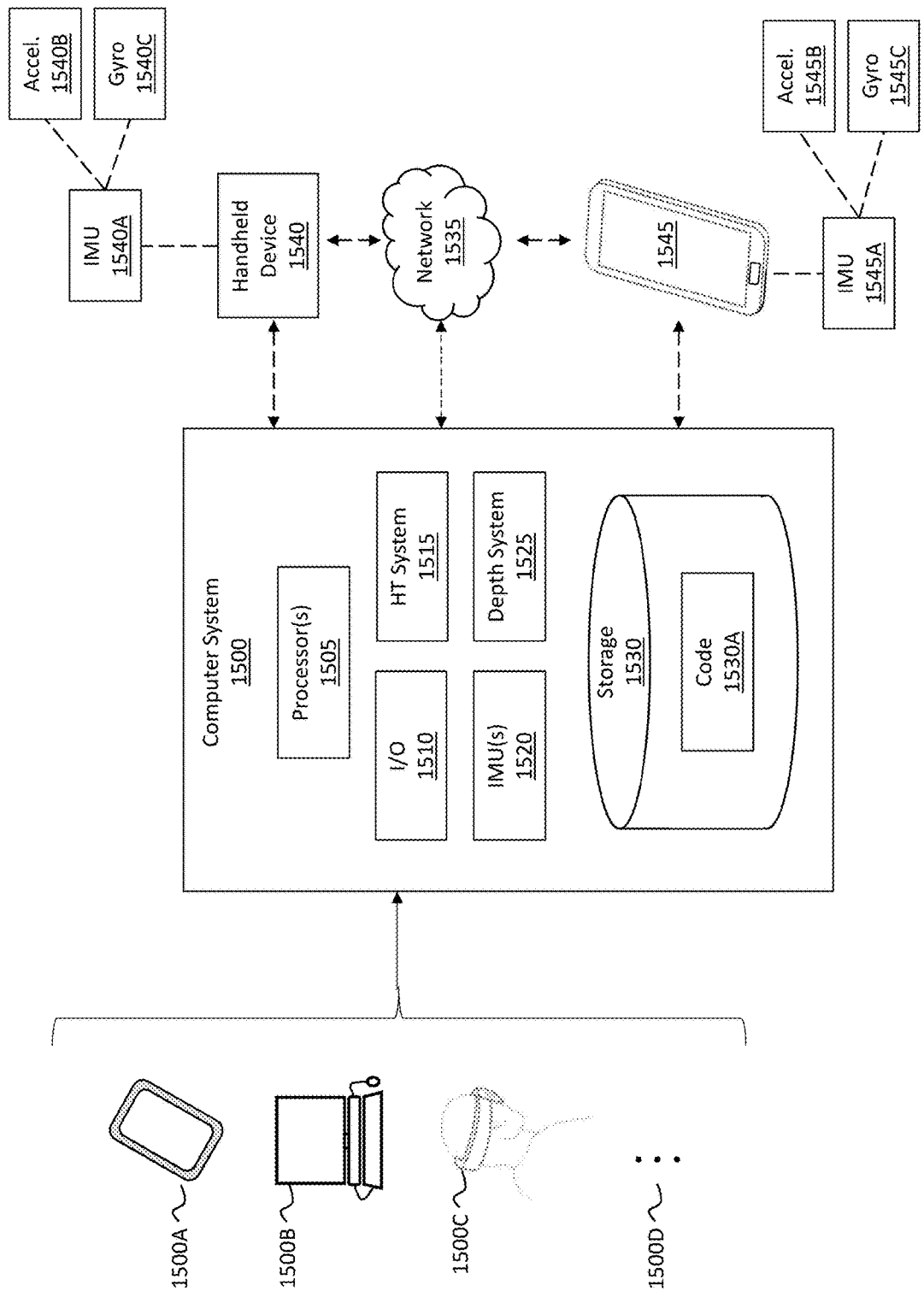
FIG. 15 illustrates an example of a computer system configured to include or perform at least a portion of the disclosed embodiments.

Attention will now be directed to FIG. 15 which illustrates an example computer system 1500 that may include and/or be used to perform the operations described herein. In particular, this computer system 1500 may be in the form of the MR systems/devices that were described earlier.

Computer system 1500 may take various different forms. For example, in FIG. 15, computer system 1500 may be embodied as a tablet 1500A, a desktop 1500B, or an HMD 1500C (with a corresponding MR rendering engine and display device), such as those described throughout this disclosure. The ellipsis 1500D demonstrates that computer system 1500 may be embodied in any form.

Computer system 1500 may also be a distributed system that includes one or more connected computing components/ devices that are in communication with computer system 1500, a laptop computer, a mobile phone, a server, a data center, and/or any other computer system. The ellipsis 1500D also indicates that other system subcomponents may be included or attached with the computer system 1500, including, for example, sensors that are configured to detect sensor data such as user attributes (e.g., heart rate sensors), as well as sensors like cameras and other sensors that are configured to detect sensor data such as environmental conditions and location/positioning (e.g., clocks, pressure sensors, temperature sensors, gyroscopes, accelerometers and so forth), all of which sensor data may comprise different types of information used during application of the disclosed embodiments. Some of the embodiments are implemented as handheld devices or handheld depth cameras. Some embodiments are also operable in robotics, drones, ambient settings, and any type of mobile phone.

In its most basic configuration, computer system 1500 includes various different components. FIG. 15 shows that computer system 1500 includes at least one processor 1505 (aka a "hardware processing unit"), input/output ("I/O") 1510, HT system 1515 (which may include any number of HT cameras), IMU(s) 1520, a depth system 1525 (or surface reconstruction engine), and storage 1530.

HT system 1515 may include any number of HT cameras. These cameras may be configured in the manner described earlier, and the HT system 1515 may perform any of the disclosed head tracking operations.

Depth system 1525 is able to cause depth camera(s) to scan and generate a surface mesh, or spatial mapping, of an environment. Furthermore, depth system 1525 can control illuminator(s) used to provide additional illumination or texture for the MR scene. These illuminators may include visible light illuminators and/or IR light illuminators.

Depth system 1525 may also include any number of time of flight cameras, active or passive stereoscopic cameras, and/or any other type of depth cameras. Using these cameras, depth system 1525 is able to capture images of an environment and generate a 3D representation of that environment in the form of a 3D surface mesh. Accordingly, depth system 1525 includes any hardware and/or software components necessary to generate a surface mesh/spatial mapping (which may include depth images/maps, 3D dot/ point clouds, and/or 3D meshes). This surface mesh/spatial mapping may be used when segmenting and characterizing objects in the real-world environment, as described earlier.

Storage 1530 is shown as including executable code/ instructions 1530A. The executable code/instructions 1530A represent instructions that are executable by computer system 1500 to perform the disclosed operations, such as those described in the methods of FIGS. 2 and 13.

Storage 1530 may be physical system memory, which may be volatile, non-volatile, or some combination of the two. The term "memory" may also be used herein to refer to non-volatile mass storage such as physical storage media. If computer system 1500 is distributed, the processing, memory, and/or storage capability may be distributed as well. As used herein, the term "executable module," "executable component," or even "component" can refer to software objects, routines, or methods that may be executed on computer system 1500. The different components, modules, engines, and services described herein may be implemented as objects or processors that execute on computer system 1500 (e.g. as separate threads).

The disclosed embodiments may comprise or utilize a special-purpose or general-purpose computer including computer hardware, such as, for example, one or more processors (such as processor 1505) and system memory (such as storage 1530), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1500 may also be connected (via a wired or wireless connection) to external sensors (e.g., one or more remote cameras, accelerometers, gyroscopes, acoustic sensors, magnetometers, etc.). For example, computer system 1500 can communicate with a handheld device 1540 that includes an IMU 1540A. As shown, IMU 1540A includes an accelerometer 1540B and a gyroscope 1540C. Additionally, computer system 1500 can communicate with a smart phone 1545 that includes an IMU 1545A. IMU 1545A includes an accelerometer 1545B and a gyroscope 1545C. Handheld device 1540 and/or smart phone 1545 may be example implementations of the additional IMU discussed in connection with FIG. 6 (e.g., IMU 625).

Further, computer system 1500 may also be connected through one or more wired or wireless networks 1535 to remote/separate computer systems(s) that are configured to perform any of the processing described with regard to computer system 1500.

During use, a user of computer system 1500 is able to perceive information (e.g., an MR scene/environment (including VR or AR)) through a display screen that is included with the I/O 1510 of computer system 1500 and that is visible to the user. The I/O 1510 and sensors with the I/O 1510 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the mixed-reality environment.

A graphics rendering engine may also be configured, with processor 1505, to render one or more virtual objects within an MR scene. As a result, the virtual objects accurately move in response to a movement of the user and/or in response to user input as the user interacts within the virtual scene.

A "network," like the network 1535 shown in FIG. 15, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1500 will include one or more communication channels that are used to communicate with the network 1535. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1505). For example, and without limitation, illustrative types of hardware logic components that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A mixed-reality (MR) device that stabilizes visual placement of a particular hologram within an MR scene even when collected position data, which is used for the visual placement, has conflicts as a result of being collected while the MR device operates is a moving environment, the MR device comprising:

one or more processor(s); and
one or more computer-readable hardware storage device(s) having stored thereon computer-executable instructions that are executable by the one or more processor(s) to cause the MR device to:
identify a first environment that is moving relative to a second environment;
obtain first display positioning information for the first environment and second display positioning information for the second environment, wherein the first display positioning information includes conflicting data as a result of being collected while the first environment moves relative to the second environment, and wherein a combination of the first and second display positioning information constitutes environmental data;

determine that a hologram is to be visually placed within an MR scene at a fixed position relative to either one of the first environment or the second environment based on the environmental data;

upon determining that the hologram is to be visually placed within the MR scene at the fixed position relative to the first environment, selectively filter out at least some of the second display positioning information from the environmental data such that, when the environmental data is used during a placement operation in which the hologram is visually placed at the fixed position relative to the first environment, the at least some of the second display positioning information is excluded from consideration during the placement operation; or alternatively, upon determining that the hologram is to be visually placed within the MR scene at the fixed position relative to the second environment, selectively filter out at least some of the first display positioning information from the environmental data such that, when the environmental data is used during the placement operation in which the hologram is visually placed at the fixed position relative to the second environment, the at least some of the first display positioning information is excluded from consideration during the placement operation.

2. The MR device of claim 1, wherein execution of the computer-executable instructions further causes the MR device to visually place the hologram at the fixed position within the MR scene.

3. The MR device of claim 1, wherein the conflicting data includes first data and second data, wherein the first data is obtained from an inertial measurement unit (IMU), and wherein the IMU is included as a part of the MR device.

4. The MR device of claim 3, wherein a second IMU is provided to generate the second display positioning information, the second IMU being located at a location removed from the MR device, and wherein the second IMU is included as a part of at least one of: (i) a smart phone, (ii) a handheld device, or (iii) an integral part of the second environment.

5. The MR device of claim 1, wherein the conflicting data includes first data and second data, and wherein the second data is obtained from head tracking cameras disposed on the MR device.

6. The MR device of claim 1, wherein the conflicting data includes first data and second data, wherein the first data is generated by an inertial measurement unit (IMU) and the second data is generated by a head tracking camera, and wherein a full discrepancy is identified between the first data and the second data.

7. The MR device of claim 1, wherein the conflicting data includes first data and second data, wherein the first data is generated by an inertial measurement unit (IMU) and the second data is generated by a head tracking camera, and wherein a partial discrepancy is identified between the first data and the second data.

8. The MR device of claim 1, wherein the first environment is inside of a moving unit and the second environment is a real-world environment through which the moving unit is moving.

9. The MR device of claim 1, wherein execution of the computer-executable instructions further causes the MR device to:
 identify a third environment, wherein the first environment and the second environment are moving relative to the third environment;
 obtain third display positioning information for the third environment and include the third display positioning information in the environmental data; and
 instead of visually placing the hologram at the fixed position relative to either one of the first environment or the second environment, visually place the hologram at the fixed position relative to the third environment by selectively filtering out at least some of the first display positioning information and at least some of the second display positioning information from the environmental data such that, when the environmental data is used during the placement operation in which the hologram is visually placed at the fixed position relative to the third environment, the at least some of the first display positioning information and the at least some of the second display positioning information are excluded from consideration during the placement operation.

10. The MR device of claim 1, wherein movements of the first environment relative to the second environment are detectable by an inertial measurement unit (IMU) disposed on the MR device, the movements being detectable in any one or more of a six degrees of freedom that include a surge, a heave, a sway, a pitch, a roll, or a yaw.

11. A method for stabilizing visual placement of a hologram within a mixed-reality (MR) scene provided by an MR device, the stabilizing being provided even when collected position data, which is used for the visual placement, has conflicts as a result of being collected while the MR device operates in a moving environment, the method comprising:
 identifying a first environment that is moving relative to a second environment;
 obtaining first display positioning information for the first environment and second display positioning information for the second environment, wherein the first display positioning information includes conflicting data as a result of being collected while the first environment moves relative to the second environment, and wherein a combination of the first and second display positioning information constitutes environmental data;
 determining that a hologram is to be visually placed within an MR scene at a fixed position relative to either one of the first environment or the second environment based on the environmental data;
 upon determining that the hologram is to be visually placed within the MR scene at the fixed position relative to the first environment, selectively filtering out at least some of the second display positioning information from the environmental data such that, when the environmental data is used during a placement operation in which the hologram is visually placed at the fixed position relative to the first environment, the at least some of the second display positioning information is excluded from consideration during the placement operation; or alternatively,
 upon determining that the hologram is to be visually placed within the MR scene at the fixed position relative to the second environment, selectively filtering out at least some of the first display positioning information from the environmental data such that, when the environmental data is used during the placement operation in which the hologram is visually placed at the fixed position relative to the second environment, the at least some of the first display positioning information is excluded from consideration during the placement operation.

12. The method of claim 11, wherein the conflicting data includes first data and second data, wherein the first data is generated by an inertial measurement unit (IMU) and the second data is generated by one or more head tracking cameras, and wherein a full discrepancy is identified between the first data and the second data.

13. The method of claim 11, wherein the conflicting data includes first data and second data, wherein the first data is generated by an inertial measurement unit (IMU) and the second data is generated by one or more head tracking cameras, and wherein a partial discrepancy is identified between the first data and the second data.

14. The method of claim 11, wherein the first display positioning information is selected based, at least in part, on a surface depth mesh of the first environment.

15. The method of claim 14, wherein selectively filtering out the at least some of the first display positioning information includes filtering out at least some data included in the surface depth mesh of the first environment.

16. The method of claim 11, wherein the MR device includes an inertial measurement unit (IMU) and a head tracking camera, the IMU and the head tracking camera being used to generate the first display positioning information, and wherein a second IMU is provided to generate the second display positioning information, the second IMU being located at a location removed from the MR device.

17. The method of claim 11, wherein the method further includes the MR device visually placing the hologram at the fixed position within the MR scene.

18. The method of claim 11, wherein movements of the first environment relative to the second environment are detectable by an inertial measurement unit (IMU) disposed on the MR device, the movements being detectable in any one or more of a six degrees of freedom that include a surge, a heave, a sway, a pitch, a roll, or a yaw.

19. One or more hardware storage device(s) having stored thereon computer-executable instructions that are executable by one or more processor(s) of an MR device to cause the MR device to:
  identify a first environment that is moving relative to a second environment;
  obtain first display positioning information for the first environment and second display positioning information for the second environment, wherein the first display positioning information includes conflicting data as a result of being collected while the first environment moves relative to the second environment, and wherein a combination of the first and second display positioning information constitutes environmental data;
  determine that a hologram is to be visually placed within an MR scene at a fixed position relative to either one of the first environment or the second environment based on the environmental data;
  upon determining that the hologram is to be visually placed within the MR scene at the fixed position relative to the first environment, selectively filter out at least some of the second display positioning information from the environmental data such that, when the environmental data is used during a placement operation in which the hologram is visually placed at the fixed position relative to the first environment, the at least some of the second display positioning information is excluded from consideration during the placement operation; or alternatively,
  upon determining that the hologram is to be visually placed within the MR scene at the fixed position relative to the second environment, selectively filter out at least some of the first display positioning information from the environmental data such that, when the environmental data is used during the placement operation in which the hologram is visually placed at the fixed position relative to the second environment, the at least some of the first display positioning information is excluded from consideration during the placement operation.

20. The one or more hardware storage device(s) of claim 19, wherein execution of the computer-executable instructions further causes the MR device to visually place the hologram at the fixed position within the MR scene.

* * * * *